(12) United States Patent
DeLoach

(10) Patent No.: US 8,447,672 B2
(45) Date of Patent: *May 21, 2013

(54) UNIVERSAL PAYMENT PROTECTION

(75) Inventor: John Mark DeLoach, Wilmington, NC (US)

(73) Assignee: JP Morgan Chase Bank, N.A., New York, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/082,165

(22) Filed: Apr. 7, 2011

(65) Prior Publication Data

US 2011/0184846 A1    Jul. 28, 2011

Related U.S. Application Data

(63) Continuation of application No. 12/645,927, filed on Dec. 23, 2009, which is a continuation of application No. 11/331,141, filed on Jan. 13, 2006, now Pat. No. 7,941,355.

(51) Int. Cl.
    *G06Q 40/00* (2012.01)
(52) U.S. Cl.
    USPC ............ 705/35; 705/37; 705/39; 705/38; 705/4; 705/42; 705/40
(58) Field of Classification Search
    USPC .......... 705/30–45, 2, 4; 709/217, 227; 726/35
    See application file for complete search history.

(56) References Cited

U.S. PATENT DOCUMENTS

| | | | |
|---|---|---|---|
| 2,005,003 A | 6/1935 | Patton et al. | |
| 3,230,650 A | 1/1966 | Orkin | |
| 3,713,235 A | 1/1973 | Roberts | |
| 3,855,033 A | 12/1974 | Staats | |
| 3,938,090 A | 2/1976 | Borison et al. | |
| 4,022,943 A | 5/1977 | Erb et al. | |
| 4,058,220 A | 11/1977 | Torongo | |
| D248,203 S | 6/1978 | Morse | |
| 4,123,747 A | 10/1978 | Lancto et al. | |
| 4,130,881 A | 12/1978 | Haessler et al. | |

(Continued)

FOREIGN PATENT DOCUMENTS

| | | |
|---|---|---|
| DE | 19702532 | 3/1998 |
| DE | 102006015818 | 10/2007 |

(Continued)

OTHER PUBLICATIONS

U.S. Appl. No. 12/645,927—Non-Final Rejection dated Aug. 5, 2010.

(Continued)

*Primary Examiner* — Tien Nguyen
(74) *Attorney, Agent, or Firm* — Lowenstein Sandler LLP

(57) ABSTRACT

A system for and method of providing payment protection upon the occurrence of trigger events. The system and method include an account, which may be associated with a credit card or other financial product. An accountholder may select trigger events and associated benefits. Upon the occurrence of a trigger event, the issuing entity will evaluate whether the accountholder is entitled to receive an associated benefit. Each benefit is intended to address at least one payment obligation. For example, an account may include payment protection in the form of automatic payment of minimum monthly credit card fees should the accountholder involuntarily become unemployed.

14 Claims, 3 Drawing Sheets

U.S. PATENT DOCUMENTS

| | | |
|---|---|---|
| 4,205,780 A | 6/1980 | Burns et al. |
| 4,223,403 A | 9/1980 | Konheim et al. |
| D259,048 S | 4/1981 | Peterson |
| 4,264,808 A | 4/1981 | Owens et al. |
| 4,319,336 A | 3/1982 | Andersen et al. |
| 4,321,672 A | 3/1982 | Braun et al. |
| 4,338,587 A | 7/1982 | Chiappetti |
| 4,380,699 A | 4/1983 | Monnier et al. |
| 4,453,074 A | 6/1984 | Weinstein |
| 4,454,414 A | 6/1984 | Benton |
| 4,479,995 A | 10/1984 | Suzuki et al. |
| 4,575,127 A | 3/1986 | Michel |
| 4,575,621 A | 3/1986 | Dreifus |
| 4,605,820 A | 8/1986 | Campbell, Jr. |
| 4,605,844 A | 8/1986 | Haggan |
| 4,641,239 A | 2/1987 | Takesako |
| 4,643,452 A | 2/1987 | Chang et al. |
| 4,645,701 A | 2/1987 | Zarrow |
| 4,647,714 A | 3/1987 | Goto |
| 4,648,189 A | 3/1987 | Michel |
| 4,650,981 A | 3/1987 | Foletta |
| 4,661,658 A | 4/1987 | Matyas |
| 4,669,730 A | 6/1987 | Small |
| 4,697,072 A | 9/1987 | Kawana |
| 4,701,601 A | 10/1987 | Francini et al. |
| 4,707,594 A | 11/1987 | Roth |
| 4,713,760 A | 12/1987 | Yamada et al. |
| 4,723,212 A | 2/1988 | O'Brien |
| 4,736,094 A | 4/1988 | Yoshida |
| 4,747,620 A | 5/1988 | Kay et al. |
| 4,755,661 A | 7/1988 | Ruebsam |
| 4,777,563 A | 10/1988 | Teraoka et al. |
| 4,817,949 A | 4/1989 | Bachman et al. |
| 4,839,504 A | 6/1989 | Nakano |
| 4,845,347 A | 7/1989 | McCrindle |
| 4,851,650 A | 7/1989 | Kitade |
| 4,856,857 A | 8/1989 | Takeuchi et al. |
| 4,859,837 A | 8/1989 | Halpern |
| 4,866,545 A | 9/1989 | LaManna et al. |
| 4,877,947 A | 10/1989 | Masu et al. |
| 4,891,503 A | 1/1990 | Jewell |
| D305,887 S | 2/1990 | Nishimura |
| 4,910,672 A | 3/1990 | Off |
| 4,931,623 A | 6/1990 | Nakamura et al. |
| 4,938,830 A | 7/1990 | Cannistra |
| 4,948,174 A | 8/1990 | Thomson et al. |
| 4,953,085 A | 8/1990 | Atkins |
| D310,386 S | 9/1990 | Michels et al. |
| 4,977,501 A | 12/1990 | Lefevre |
| 4,986,868 A | 1/1991 | Schmidt |
| 5,023,782 A | 6/1991 | Lutz et al. |
| 5,025,139 A | 6/1991 | Halliburton |
| 5,054,096 A | 10/1991 | Beizer |
| 5,056,019 A | 10/1991 | Schultz et al. |
| 5,072,380 A | 12/1991 | Randelman et al. |
| 5,097,115 A | 3/1992 | Ogasawara et al. |
| 5,121,945 A | 6/1992 | Thomson et al. |
| 5,122,950 A | 6/1992 | Mee |
| 5,140,517 A | 8/1992 | Nagata et al. |
| 5,163,098 A | 11/1992 | Dahbura |
| 5,173,851 A | 12/1992 | Off et al. |
| 5,175,682 A | 12/1992 | Higashiyama |
| 5,177,342 A | 1/1993 | Adams |
| 5,185,697 A | 2/1993 | Jacobs et al. |
| 5,187,750 A | 2/1993 | Behera |
| 5,191,522 A | 3/1993 | Bosco et al. |
| 5,201,010 A | 4/1993 | Gabriel |
| 5,214,700 A | 5/1993 | Pinkas et al. |
| 5,231,569 A | 7/1993 | Myatt et al. |
| 5,237,620 A | 8/1993 | Deaton |
| 5,239,462 A | 8/1993 | Jones |
| 5,257,486 A | 11/1993 | Holmwall |
| 5,265,008 A | 11/1993 | Benton et al. |
| 5,305,196 A | 4/1994 | Deaton et al. |
| 5,327,508 A | 7/1994 | Deaton et al. |
| 5,351,187 A | 9/1994 | Hassett |
| 5,352,877 A | 10/1994 | Morley |
| 5,361,062 A | 11/1994 | Weiss et al. |
| 5,380,046 A | 1/1995 | Stephens |
| 5,382,784 A | 1/1995 | Eberhardt |
| 5,383,687 A | 1/1995 | Suess et al. |
| 5,388,165 A | 2/1995 | Gabriel |
| 5,409,092 A | 4/1995 | Itako et al. |
| 5,412,190 A | 5/1995 | Kopesec |
| 5,412,192 A | 5/1995 | Hoss |
| 5,413,341 A | 5/1995 | Lieberman |
| 5,428,684 A | 6/1995 | Akiyama et al. |
| 5,430,644 A | 7/1995 | Deaton et al. |
| 5,432,326 A | 7/1995 | Noblett et al. |
| 5,440,108 A | 8/1995 | Tran et al. |
| 5,444,794 A | 8/1995 | Uhland |
| 5,448,471 A | 9/1995 | Deaton et al. |
| 5,450,491 A | 9/1995 | McNair |
| 5,457,305 A | 10/1995 | Akel et al. |
| 5,466,920 A | 11/1995 | Nair et al. |
| 5,481,094 A | 1/1996 | Suda |
| 5,482,139 A | 1/1996 | Rivalto |
| 5,489,123 A | 2/1996 | Roshkoff |
| 5,495,981 A | 3/1996 | Warther |
| 5,500,890 A | 3/1996 | Rogge et al. |
| 5,503,891 A | 4/1996 | Marshall et al. |
| 5,532,689 A | 7/1996 | Bueno |
| 5,539,825 A | 7/1996 | Akiyama et al. |
| 5,541,583 A | 7/1996 | Mandelbaum |
| 5,546,446 A | 8/1996 | Tsunokawa et al. |
| 5,557,092 A | 9/1996 | Ackley et al. |
| 5,557,516 A | 9/1996 | Hogan |
| 5,563,934 A | 10/1996 | Eda |
| 5,572,004 A | 11/1996 | Raimann |
| 5,583,933 A | 12/1996 | Mark |
| 5,609,253 A | 3/1997 | Goade, Sr. |
| 5,617,474 A | 4/1997 | Ditzig et al. |
| 5,619,558 A | 4/1997 | Jheeta |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,649,118 A | 7/1997 | Carlisle et al. |
| 5,650,604 A | 7/1997 | Marcous et al. |
| 5,652,786 A | 7/1997 | Rogers |
| 5,659,469 A | 8/1997 | Deaton et al. |
| 5,677,521 A | 10/1997 | Garrou |
| 5,680,459 A | 10/1997 | Hook et al. |
| 5,698,837 A | 12/1997 | Furuta |
| 5,704,044 A | 12/1997 | Tarter et al. |
| 5,715,298 A | 2/1998 | Rogers |
| 5,732,136 A | 3/1998 | Murphree et al. |
| 5,744,787 A | 4/1998 | Teicher |
| 5,745,555 A | 4/1998 | Mark |
| 5,748,737 A | 5/1998 | Daggar |
| 5,774,882 A | 6/1998 | Keen |
| 5,787,403 A | 7/1998 | Randle |
| 5,789,732 A | 8/1998 | McMahon et al. |
| 5,790,636 A | 8/1998 | Marshall |
| 5,796,827 A | 8/1998 | Coppersmith et al. |
| 5,797,133 A | 8/1998 | Jones |
| 5,798,950 A | 8/1998 | Fitzgerald |
| 5,806,042 A | 9/1998 | Kelly et al. |
| 5,806,047 A | 9/1998 | Hackel et al. |
| 5,814,796 A | 9/1998 | Benson et al. |
| 5,825,871 A | 10/1998 | Mark |
| 5,826,243 A | 10/1998 | Musmanno et al. |
| 5,832,090 A | 11/1998 | Raspotnik |
| 5,842,421 A | 12/1998 | Desilets et al. |
| 5,870,456 A | 2/1999 | Rogers |
| 5,877,975 A | 3/1999 | Jigour et al. |
| D408,054 S | 4/1999 | Leedy, Jr. |
| 5,897,621 A | 4/1999 | Boesch et al. |
| 5,901,303 A | 5/1999 | Chew |
| 5,903,879 A | 5/1999 | Mitchell |
| 5,907,142 A | 5/1999 | Kelsey |
| 5,907,828 A | 5/1999 | Meyer et al. |
| 5,907,831 A | 5/1999 | Lotvin et al. |
| 5,918,211 A | 6/1999 | Sloane |
| 5,926,792 A | 7/1999 | Koppes et al. |

| | | | | | | |
|---|---|---|---|---|---|---|
| 5,928,082 | A | 7/1999 | Clapper, Jr. | D449,336 | S | 10/2001 | Webb et al. |
| 5,933,812 | A | 8/1999 | Meyer et al. | 6,302,444 | B1 | 10/2001 | Cobben |
| 5,936,221 | A | 8/1999 | Corder et al. | 6,308,887 | B1 | 10/2001 | Korman et al. |
| 5,946,669 | A | 8/1999 | Polk | 6,315,193 | B1 | 11/2001 | Hogan |
| 5,949,044 | A | 9/1999 | Walker et al. | 6,315,195 | B1 | 11/2001 | Ramachandran |
| 5,956,711 | A | 9/1999 | Sullivan et al. | 6,315,196 | B1 | 11/2001 | Bachman |
| 5,960,411 | A | 9/1999 | Hartman et al. | 6,321,211 | B1 | 11/2001 | Dodd |
| 5,963,925 | A | 10/1999 | Kolling et al. | 6,324,524 | B1 | 11/2001 | Lent et al. |
| 5,970,469 | A | 10/1999 | Scroggie et al. | 6,324,526 | B1 | 11/2001 | D'Agostino |
| 5,970,478 | A | 10/1999 | Walker et al. | 6,327,573 | B1 | 12/2001 | Walker et al. |
| 5,979,757 | A | 11/1999 | Tracy | 6,327,575 | B1 | 12/2001 | Katz |
| 5,991,736 | A | 11/1999 | Ferguson et al. | 6,330,543 | B1 | 12/2001 | Kepecs |
| 5,999,596 | A | 12/1999 | Walker et al. | 6,330,546 | B1 | 12/2001 | Gopinathan et al. |
| 5,999,624 | A | 12/1999 | Hopkins | 6,332,126 | B1 | 12/2001 | Peirce et al. |
| 5,999,917 | A | 12/1999 | Facciani et al. | 6,334,108 | B1 | 12/2001 | Deaton et al. |
| 6,006,205 | A | 12/1999 | Loeb et al. | 6,338,048 | B1 | 1/2002 | Mori |
| 6,009,411 | A | 12/1999 | Kepecs | 6,344,108 | B1 | 2/2002 | Von Medvey et al. |
| 6,012,049 | A | 1/2000 | Kawan | 6,349,290 | B1 | 2/2002 | Horowitz et al. |
| 6,014,634 | A | 1/2000 | Scroggie et al. | 6,349,972 | B1 | 2/2002 | Geiger et al. |
| 6,018,718 | A | 1/2000 | Walker et al. | 6,351,735 | B1 | 2/2002 | Deaton et al. |
| 6,021,189 | A | 2/2000 | Vu | 6,356,881 | B1 | 3/2002 | Milch et al. |
| 6,024,286 | A | 2/2000 | Bradley et al. | 6,360,209 | B1 | 3/2002 | Loeb et al. |
| 6,025,283 | A | 2/2000 | Roberts | 6,366,967 | B1 | 4/2002 | Wagner |
| 6,029,144 | A | 2/2000 | Barrett et al. | 6,374,230 | B1 | 4/2002 | Walker et al. |
| 6,029,153 | A | 2/2000 | Bauchner et al. | 6,377,669 | B1 | 4/2002 | Walker et al. |
| 6,032,859 | A | 3/2000 | Muehlberger et al. | 6,377,935 | B1 | 4/2002 | Deaton et al. |
| 6,044,360 | A | 3/2000 | Picciallo | 6,382,677 | B1 | 5/2002 | Kaule et al. |
| 6,045,050 | A | 4/2000 | Ippolito et al. | 6,385,594 | B1 | 5/2002 | Lebda et al. |
| 6,048,271 | A | 4/2000 | Barcelou | 6,404,866 | B1 | 6/2002 | Hopper et al. |
| 6,055,573 | A | 4/2000 | Gardenswartz et al. | 6,405,175 | B1 | 6/2002 | Ng |
| 6,061,660 | A | 5/2000 | Eggleston et al. | 6,405,181 | B2 | 6/2002 | Lent et al. |
| D427,167 | S | 6/2000 | Iwasaki | 6,409,080 | B2 | 6/2002 | Kawagishi |
| 6,085,976 | A | 7/2000 | Sehr | 6,409,593 | B1 | 6/2002 | Petrecca |
| 6,089,284 | A | 7/2000 | Kaehler et al. | 6,411,947 | B1 | 6/2002 | Rice et al. |
| 6,092,057 | A | 7/2000 | Zimmermann et al. | 6,419,161 | B1 | 7/2002 | Haddad |
| 6,105,006 | A | 8/2000 | Davis et al. | 6,424,947 | B1 | 7/2002 | Tsuria et al. |
| 6,105,007 | A | 8/2000 | Norris | 6,424,949 | B1 | 7/2002 | Deaton et al. |
| 6,105,008 | A | 8/2000 | Davis et al. | 6,424,951 | B1 | 7/2002 | Shurling et al. |
| 6,105,009 | A | 8/2000 | Cuervo | 6,434,534 | B1 | 8/2002 | Walker et al. |
| 6,108,642 | A | 8/2000 | Findley | D462,477 | S | 9/2002 | Osborne |
| 6,109,525 | A | 8/2000 | Blomqvist et al. | 6,454,647 | B1 | 9/2002 | Woodbury, Jr. |
| 6,112,190 | A | 8/2000 | Fletcher et al. | 6,456,981 | B1 | 9/2002 | Dejaeger et al. |
| 6,112,191 | A | 8/2000 | Burke | 6,470,306 | B1 | 10/2002 | Pringle et al. |
| 6,119,097 | A | 9/2000 | Ibarra | 6,471,128 | B1 | 10/2002 | Corcoran et al. |
| 6,119,103 | A | 9/2000 | Basch et al. | 6,481,125 | B1 | 11/2002 | Pokrasoff |
| 6,119,107 | A | 9/2000 | Polk | 6,484,146 | B2 | 11/2002 | Day et al. |
| 6,119,933 | A | 9/2000 | Wong et al. | 6,484,428 | B1 | 11/2002 | Greenwald et al. |
| 6,129,572 | A | 10/2000 | Feldman et al. | D466,929 | S | 12/2002 | Haas |
| 6,134,309 | A | 10/2000 | Carson | D467,271 | S | 12/2002 | Haas |
| 6,138,911 | A | 10/2000 | Fredregill et al. | D467,272 | S | 12/2002 | Haas |
| 6,141,666 | A | 10/2000 | Tobin | 6,488,206 | B1 | 12/2002 | Flaig et al. |
| 6,142,640 | A | 11/2000 | Schofield | 6,490,568 | B1 | 12/2002 | Omara et al. |
| 6,144,848 | A | 11/2000 | Walsh et al. | 6,491,782 | B1 | 12/2002 | Jaynes |
| 6,148,293 | A | 11/2000 | King | D468,789 | S | 1/2003 | Arnold et al. |
| 6,163,771 | A | 12/2000 | Walker et al. | 6,505,095 | B1 | 1/2003 | Kolls |
| 6,164,548 | A | 12/2000 | Curiel | 6,505,780 | B1 | 1/2003 | Yassin et al. |
| 6,169,974 | B1 | 1/2001 | Baumgartner et al. | 6,507,644 | B1 | 1/2003 | Henderson et al. |
| 6,179,211 | B1 | 1/2001 | Green et al. | 6,513,019 | B2 | 1/2003 | Lewis |
| 6,182,059 | B1 | 1/2001 | Angotti et al. | 6,516,302 | B1 | 2/2003 | Deaton et al. |
| D437,882 | S | 2/2001 | Creighton | 6,529,880 | B1 | 3/2003 | McKeen et al. |
| 6,185,541 | B1 | 2/2001 | Scroggie et al. | 6,553,113 | B1 | 4/2003 | Dhir et al. |
| 6,188,309 | B1 | 2/2001 | Levine | 6,557,039 | B1 | 4/2003 | Leong et al. |
| 6,192,113 | B1 | 2/2001 | Lorsch | D474,235 | S | 5/2003 | Haas |
| 6,192,142 | B1 | 2/2001 | Pare, Jr. et al. | 6,557,750 | B1 | 5/2003 | Druse et al. |
| 6,213,392 | B1 | 4/2001 | Zuppichich | 6,557,766 | B1 | 5/2003 | Leighton |
| 6,222,914 | B1 | 4/2001 | McMullin | 6,558,255 | B2 | 5/2003 | Walker et al. |
| 6,223,143 | B1 | 4/2001 | Weinstock et al. | 6,560,581 | B1 | 5/2003 | Fox et al. |
| D442,627 | S | 5/2001 | Webb et al. | 6,561,657 | B1 | 5/2003 | Schofield |
| 6,227,445 | B1 | 5/2001 | Brookner | 6,564,189 | B1 | 5/2003 | Nycz |
| 6,227,972 | B1 | 5/2001 | Walker et al. | 6,567,786 | B1 | 5/2003 | Bibelnieks et al. |
| 6,243,689 | B1 | 6/2001 | Norton | 6,567,791 | B2 | 5/2003 | Lent et al. |
| 6,260,758 | B1 | 7/2001 | Blumberg | 6,567,821 | B1 | 5/2003 | Polk |
| 6,267,292 | B1 | 7/2001 | Walker et al. | 6,571,216 | B1 | 5/2003 | Garg et al. |
| 6,278,996 | B1 | 8/2001 | Richardson et al. | 6,575,361 | B1 | 6/2003 | Graves et al. |
| 6,282,516 | B1 | 8/2001 | Giullani | 6,578,012 | B1 | 6/2003 | Storey |
| 6,289,322 | B1 | 9/2001 | Kitchen et al. | 6,581,831 | B2 | 6/2003 | Madani |
| 6,289,324 | B1 | 9/2001 | Kawan | 6,581,845 | B2 | 6/2003 | Ye |
| 6,292,786 | B1 | 9/2001 | Deaton et al. | D476,681 | S | 7/2003 | Al Amri |
| 6,295,344 | B1 | 9/2001 | Marshall | D476,683 | S | 7/2003 | Kilburn |

| | | |
|---|---|---|
| D477,359 S | 7/2003 | Haas |
| D477,634 S | 7/2003 | Malone |
| 6,592,044 B1 | 7/2003 | Wong et al. |
| 6,595,342 B1 | 7/2003 | Maritzen et al. |
| 6,601,040 B1 | 7/2003 | Kolls |
| 6,607,127 B2 | 8/2003 | Wong |
| 6,609,104 B1 | 8/2003 | Deaton et al. |
| 6,609,113 B1 | 8/2003 | O'Leary et al. |
| 6,609,654 B1 | 8/2003 | Anderson et al. |
| 6,609,658 B1 | 8/2003 | Sehr |
| 6,611,811 B1 | 8/2003 | Deaton et al. |
| 6,611,819 B1 | 8/2003 | Oneda |
| 6,615,189 B1 | 9/2003 | Phillips et al. |
| 6,615,190 B1 | 9/2003 | Slater |
| D481,067 S | 10/2003 | Haas |
| D481,068 S | 10/2003 | Blossom et al. |
| 6,644,551 B2 | 11/2003 | Clayman et al. |
| 6,647,374 B2 | 11/2003 | Kansal |
| 6,647,376 B1 | 11/2003 | Farrar et al. |
| D483,407 S | 12/2003 | Ramnarine |
| 6,655,587 B2 | 12/2003 | Andrews et al. |
| 6,655,598 B1 | 12/2003 | Curiel |
| 6,659,259 B2 | 12/2003 | Knox et al. |
| 6,662,215 B1 | 12/2003 | Moskowitz et al. |
| 6,665,687 B1 | 12/2003 | Burke |
| 6,671,673 B1 | 12/2003 | Baseman et al. |
| D485,573 S | 1/2004 | Li |
| 6,675,149 B1 | 1/2004 | Ruffin et al. |
| 6,684,195 B1 | 1/2004 | Deaton et al. |
| 6,697,799 B1 | 2/2004 | Neal et al. |
| 6,705,518 B2 | 3/2004 | Park et al. |
| 6,715,797 B2 | 4/2004 | Curiel |
| 6,718,313 B1 | 4/2004 | Lent et al. |
| 6,721,743 B1 | 4/2004 | Sakakibara |
| 6,726,813 B2 | 4/2004 | Kaule et al. |
| 6,727,802 B2 | 4/2004 | Kelly et al. |
| 6,732,919 B2 | 5/2004 | Macklin et al. |
| 6,742,125 B1 | 5/2004 | Gabber et al. |
| D490,840 S | 6/2004 | Arakaki et al. |
| D491,186 S | 6/2004 | Arakaki et al. |
| D491,953 S | 6/2004 | Arakaki et al. |
| 6,754,640 B2 | 6/2004 | Bozeman |
| 6,757,660 B2 | 6/2004 | Canada et al. |
| 6,757,710 B2 | 6/2004 | Reed |
| D493,195 S | 7/2004 | Creighton |
| 6,764,014 B2 | 7/2004 | Lasch et al. |
| D495,736 S | 9/2004 | Scharf |
| D496,365 S | 9/2004 | Liu et al. |
| 6,793,131 B2 | 9/2004 | Hogan |
| 6,793,135 B1 | 9/2004 | Ryoo |
| 6,795,809 B2 | 9/2004 | O'Brien et al. |
| 6,795,812 B1 | 9/2004 | Lent et al. |
| 6,804,786 B1 | 10/2004 | Chamley et al. |
| 6,805,288 B2 | 10/2004 | Routhenstein et al. |
| 6,805,289 B2 | 10/2004 | Noriega et al. |
| D498,236 S | 11/2004 | Liu et al. |
| 6,814,282 B2 | 11/2004 | Seifert et al. |
| 6,817,008 B2 | 11/2004 | Ledford et al. |
| 6,819,748 B2 | 11/2004 | Matada |
| 6,820,061 B2 | 11/2004 | Postrel |
| 6,829,586 B2 | 12/2004 | Postrel |
| 6,834,796 B2 | 12/2004 | Anvekar et al. |
| 6,842,739 B2 | 1/2005 | Postrel |
| 6,845,906 B2 | 1/2005 | Royer et al. |
| D501,875 S | 2/2005 | Dean |
| 6,856,973 B1 | 2/2005 | Bott |
| 6,857,566 B2 | 2/2005 | Wankmueller |
| RE38,717 E | 3/2005 | Bothwell |
| 6,871,174 B1 | 3/2005 | Dolan et al. |
| 6,874,139 B2 | 3/2005 | Krueger et al. |
| 6,880,084 B1 | 4/2005 | Brittenham et al. |
| 6,885,994 B1 | 4/2005 | Scroggie et al. |
| 6,886,046 B2 | 4/2005 | Stutz et al. |
| D505,450 S | 5/2005 | Lauer et al. |
| 6,886,741 B1 | 5/2005 | Salveson |
| 6,889,198 B2 | 5/2005 | Kawan |
| 6,892,187 B2 | 5/2005 | Phillips et al. |
| 6,895,383 B2 | 5/2005 | Heinrich |
| 6,895,386 B1 | 5/2005 | Bachman et al. |
| 6,901,375 B2 | 5/2005 | Fernandez |
| 6,901,406 B2 | 5/2005 | Nabe et al. |
| 6,912,502 B1 | 6/2005 | Buddle et al. |
| 6,913,193 B1 | 7/2005 | Kawan |
| 6,915,271 B1 | 7/2005 | Meyer et al. |
| 6,920,611 B1 | 7/2005 | Spaeth et al. |
| 6,924,026 B2 | 8/2005 | Jaynes |
| 6,931,382 B2 | 8/2005 | Laage et al. |
| 6,938,156 B2 | 8/2005 | Wheeler et al. |
| RE38,801 E | 9/2005 | Rogers |
| 6,942,156 B2 | 9/2005 | Ohta et al. |
| 6,942,569 B2 | 9/2005 | Petracca |
| 6,945,453 B1 | 9/2005 | Schwarz, Jr. |
| 6,947,898 B2 | 9/2005 | Postrel |
| 6,950,940 B2 | 9/2005 | Wheeler et al. |
| 6,954,741 B1 | 10/2005 | Burchetta et al. |
| 6,961,710 B1 | 11/2005 | Yanagisawa et al. |
| 6,963,857 B1 | 11/2005 | Johnson |
| 6,968,348 B1 | 11/2005 | Carone et al. |
| 6,970,830 B1 | 11/2005 | Samra et al. |
| 6,978,369 B2 | 12/2005 | Wheeler et al. |
| 6,985,873 B2 | 1/2006 | Sullivan |
| 6,985,879 B2 | 1/2006 | Walker et al. |
| 6,999,569 B2 | 2/2006 | Risafi et al. |
| 6,999,938 B1 | 2/2006 | Libman |
| 6,999,943 B1 | 2/2006 | Johnson et al. |
| 7,003,476 B1 | 2/2006 | Samra et al. |
| 7,006,979 B1 | 2/2006 | Samra et al. |
| 7,010,495 B1 | 3/2006 | Samra et al. |
| 7,014,110 B2 | 3/2006 | Minowa et al. |
| 7,024,374 B1 | 4/2006 | Day et al. |
| 7,025,256 B1 | 4/2006 | Drummond et al. |
| 7,031,908 B1 | 4/2006 | Huang et al. |
| 7,031,939 B1 | 4/2006 | Gallagher et al. |
| 7,039,600 B1 | 5/2006 | Meek et al. |
| 7,047,222 B1 | 5/2006 | Bush |
| 7,050,996 B1 | 5/2006 | Blagg et al. |
| 7,051,001 B1 | 5/2006 | Slater |
| 7,051,925 B2 | 5/2006 | Schwarz, Jr. |
| 7,051,929 B2 | 5/2006 | Li |
| 7,054,842 B2 | 5/2006 | James et al. |
| 7,062,031 B2 | 6/2006 | Becerra et al. |
| 7,063,924 B2 | 6/2006 | Kaminsky et al. |
| 7,066,382 B2 | 6/2006 | Kaplan |
| 7,069,244 B2 | 6/2006 | Strayer et al. |
| D524,859 S | 7/2006 | Graves et al. |
| 7,070,095 B1 | 7/2006 | Gandel et al. |
| 7,072,864 B2 | 7/2006 | Brake, Jr. et al. |
| 7,072,909 B2 | 7/2006 | Polk |
| 7,076,458 B2 | 7/2006 | Lawlor et al. |
| 7,076,465 B1 | 7/2006 | Blagg et al. |
| 7,082,416 B2 | 7/2006 | Anderson |
| 7,083,084 B2 | 8/2006 | Graves et al. |
| 7,089,202 B1 | 8/2006 | McNamar et al. |
| 7,089,503 B1 | 8/2006 | Bloomquist et al. |
| 7,090,138 B2 | 8/2006 | Rettenmyer et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D530,741 S | 10/2006 | Blossom |
| 7,120,601 B2 | 10/2006 | Chen et al. |
| 7,121,471 B2 | 10/2006 | Beenau et al. |
| 7,128,272 B2 | 10/2006 | Doublet |
| 7,143,063 B2 | 11/2006 | Lent et al. |
| D533,220 S | 12/2006 | Graves et al. |
| 7,156,301 B1 | 1/2007 | Bonalle et al. |
| 7,163,153 B2 | 1/2007 | Blossom |
| 7,165,049 B2 | 1/2007 | Slater |
| 7,167,844 B1 | 1/2007 | Leong et al. |
| 7,171,385 B1 | 1/2007 | Dembo et al. |
| 7,184,973 B2 | 2/2007 | Monteleone et al. |
| D538,349 S | 3/2007 | Hollands |
| 7,191,952 B2 | 3/2007 | Blossom |
| 7,195,154 B2 | 3/2007 | Routhenstein |
| 7,216,091 B1 | 5/2007 | Blandina et al. |
| 7,216,099 B2 | 5/2007 | Chen et al. |
| 7,225,155 B1 | 5/2007 | Polk |

| | | | | | |
|---|---|---|---|---|---|
| 7,228,155 B2 | 6/2007 | Saunders | 7,753,259 B1 | 7/2010 | Taylor et al. |
| 7,239,226 B2 | 7/2007 | Berardi et al. | 2001/0001856 A1 | 5/2001 | Gould et al. |
| 7,243,839 B2 | 7/2007 | Beck et al. | 2001/0002487 A1 | 5/2001 | Grawrock et al. |
| 7,249,092 B2 | 7/2007 | Dunn et al. | 2001/0014868 A1 | 8/2001 | Herz et al. |
| 7,249,097 B2 | 7/2007 | Hutchison et al. | 2001/0023407 A1 | 9/2001 | Liyanearachchi et al. |
| 7,249,099 B2 | 7/2007 | Ling | 2001/0025253 A1 | 9/2001 | Heintz et al. |
| 7,249,112 B2 | 7/2007 | Berardi et al. | 2001/0027389 A1 | 10/2001 | Beverina et al. |
| 7,252,223 B2 | 8/2007 | Schofield | 2001/0029490 A1 | 10/2001 | Inamochi |
| 7,252,226 B2 | 8/2007 | Risafi et al. | 2001/0034647 A1 | 10/2001 | Marks et al. |
| 7,254,560 B2 | 8/2007 | Singhal | 2001/0034651 A1 | 10/2001 | Marks et al. |
| 7,260,549 B2 | 8/2007 | Spielmann et al. | 2001/0034663 A1 | 10/2001 | Teveler et al. |
| D551,705 S | 9/2007 | Mershon | 2001/0034684 A1 | 10/2001 | Cushing et al. |
| 7,266,524 B1 | 9/2007 | Butcher, III | 2001/0034718 A1 | 10/2001 | Shaked et al. |
| 7,269,737 B2 | 9/2007 | Robinson | 2001/0034720 A1 | 10/2001 | Armes |
| 7,275,160 B2 | 9/2007 | Pearson et al. | 2001/0037243 A1 | 11/2001 | Rouston et al. |
| 7,295,999 B1 | 11/2007 | Simon et al. | 2001/0037276 A1 | 11/2001 | Kelly et al. |
| 7,306,141 B1 | 12/2007 | Schwarz | 2001/0037299 A1 | 11/2001 | Nichols et al. |
| 7,306,163 B2 | 12/2007 | Scholz et al. | 2001/0038033 A1 | 11/2001 | Habib |
| 7,310,617 B1 | 12/2007 | Cunningham | 2001/0039511 A1 | 11/2001 | Duckworth et al. |
| 7,311,244 B1 | 12/2007 | Schwarz, Jr. | 2001/0044733 A1 | 11/2001 | Lee et al. |
| 7,312,707 B1 | 12/2007 | Bishop et al. | 2001/0044764 A1 | 11/2001 | Arnold |
| 7,315,843 B2 | 1/2008 | Diveley et al. | 2001/0047332 A1 | 11/2001 | Gonen-Friedman et al. |
| 7,318,049 B2 | 1/2008 | Iannacci | 2001/0049628 A1 | 12/2001 | Icho |
| D562,888 S | 2/2008 | Brown | 2001/0051917 A1 | 12/2001 | Bissonette et al. |
| 7,333,948 B2 | 2/2008 | Bell et al. | 2001/0056399 A1 * | 12/2001 | Saylors ............................ 705/38 |
| 7,340,431 B1 | 3/2008 | McManus et al. | 2002/0002495 A1 | 1/2002 | Ullman |
| 7,346,562 B2 | 3/2008 | Inoue et al. | 2002/0004742 A1 | 1/2002 | Willcocks et al. |
| 7,346,567 B2 | 3/2008 | Weeks | 2002/0007313 A1 | 1/2002 | Mai et al. |
| 7,349,866 B2 | 3/2008 | Schwarz, Jr. | 2002/0010591 A1 | 1/2002 | Pomerance |
| 7,356,516 B2 | 4/2008 | Richey et al. | 2002/0010621 A1 | 1/2002 | Bell et al. |
| 7,357,331 B2 | 4/2008 | Blossom | 2002/0011517 A1 | 1/2002 | Namekawa et al. |
| 7,359,880 B2 | 4/2008 | Abel et al. | 2002/0013751 A1 | 1/2002 | Facciani et al. |
| 7,360,693 B1 | 4/2008 | Sullivan | 2002/0019793 A1 | 2/2002 | Frattalone |
| 7,370,004 B1 | 5/2008 | Patel et al. | 2002/0026365 A1 | 2/2002 | Natanzon |
| 7,373,304 B1 | 5/2008 | Pletz et al. | 2002/0026416 A1 | 2/2002 | Provinse |
| 7,392,221 B2 | 6/2008 | Nabe et al. | 2002/0029191 A1 | 3/2002 | Ishibashi et al. |
| 7,392,222 B1 | 6/2008 | Hamilton et al. | 2002/0032609 A1 | 3/2002 | Wilkman |
| 7,392,224 B1 | 6/2008 | Bauer et al. | 2002/0032622 A1 | 3/2002 | Petit et al. |
| 7,398,241 B2 | 7/2008 | Fay et al. | 2002/0035527 A1 | 3/2002 | Corrin |
| 7,398,248 B2 | 7/2008 | Phillips et al. | 2002/0040344 A1 | 4/2002 | Preiser et al. |
| 7,401,049 B2 | 7/2008 | Hobbs et al. | 2002/0042742 A1 | 4/2002 | Glover et al. |
| 7,401,731 B1 | 7/2008 | Pletz et al. | 2002/0042774 A1 | 4/2002 | Ortiz et al. |
| 7,406,426 B1 | 7/2008 | Pletz et al. | 2002/0046089 A1 | 4/2002 | Zorn |
| D576,671 S | 9/2008 | Field et al. | 2002/0046106 A1 | 4/2002 | Ishibashi et al. |
| D582,476 S | 12/2008 | Field et al. | 2002/0046110 A1 | 4/2002 | Gallagher |
| D582,977 S | 12/2008 | Field et al. | 2002/0046116 A1 | 4/2002 | Hohle et al. |
| 7,461,028 B2 | 12/2008 | Wronski, Jr. | 2002/0049605 A1 | 4/2002 | Hagi |
| 7,467,096 B2 | 12/2008 | Antonucci et al. | 2002/0052778 A1 | 5/2002 | Murphy et al. |
| 7,479,320 B2 | 1/2009 | Keller et al. | 2002/0055874 A1 | 5/2002 | Cohen |
| 7,493,288 B2 | 2/2009 | Biship et al. | 2002/0059103 A1 | 5/2002 | Anderson et al. |
| 7,494,057 B2 | 2/2009 | Lasch et al. | 2002/0059139 A1 | 5/2002 | Evans |
| 7,502,758 B2 | 3/2009 | Burke | 2002/0062249 A1 | 5/2002 | Iannacci |
| 7,503,503 B2 | 3/2009 | Riedl et al. | 2002/0062253 A1 | 5/2002 | Dosh et al. |
| 7,506,804 B2 | 3/2009 | Zajkowski et al. | 2002/0062257 A1 | 5/2002 | Minamishin et al. |
| 7,506,806 B2 | 3/2009 | Bonalle et al. | 2002/0065720 A1 | 5/2002 | Carswell et al. |
| 7,512,551 B2 | 3/2009 | Postrel | 2002/0065735 A1 | 5/2002 | Hatakama et al. |
| 7,523,385 B2 | 4/2009 | Nguyen et al. | 2002/0069104 A1 | 6/2002 | Beach et al. |
| 7,530,491 B2 | 5/2009 | Lasch et al. | 2002/0069109 A1 | 6/2002 | Wendkos |
| 7,580,857 B2 | 8/2009 | VanFleet et al. | 2002/0069122 A1 | 6/2002 | Yun et al. |
| 7,587,363 B2 | 9/2009 | Cataline et al. | 2002/0069158 A1 | 6/2002 | Larkin et al. |
| 7,588,184 B2 | 9/2009 | Gandel et al. | 2002/0070270 A1 | 6/2002 | Narita et al. |
| 7,591,416 B2 | 9/2009 | Blossom | 2002/0070976 A1 | 6/2002 | Tanner et al. |
| D602,522 S | 10/2009 | Field et al. | 2002/0072931 A1 | 6/2002 | Card |
| D602,986 S | 10/2009 | Skelding et al. | 2002/0072974 A1 | 6/2002 | Pugliese et al. |
| 7,606,730 B2 | 10/2009 | Antonucci | 2002/0073019 A1 | 6/2002 | Deaton |
| 7,613,629 B2 | 11/2009 | Antonucci et al. | 2002/0073030 A1 | 6/2002 | Offer |
| 7,630,935 B2 | 12/2009 | Loeger et al. | 2002/0073042 A1 | 6/2002 | Maritzen et al. |
| 7,640,205 B2 | 12/2009 | Michelassi et al. | 2002/0077890 A1 | 6/2002 | LaPointe et al. |
| 7,660,763 B1 | 2/2010 | Brake, Jr. et al. | 2002/0077895 A1 | 6/2002 | Howell |
| 7,676,425 B1 | 3/2010 | Noles | 2002/0077904 A1 | 6/2002 | Ali |
| 7,676,459 B2 | 3/2010 | Carone et al. | 2002/0077964 A1 | 6/2002 | Brody et al. |
| 7,686,218 B2 | 3/2010 | Hessburg et al. | 2002/0077966 A1 | 6/2002 | Harycki et al. |
| 7,689,504 B2 | 3/2010 | Warren et al. | 2002/0082920 A1 | 6/2002 | Austin et al. |
| 7,707,111 B2 | 4/2010 | Brake, Jr. et al. | 2002/0082962 A1 | 6/2002 | Farris et al. |
| 7,720,699 B2 * | 5/2010 | Santoloci ............................ 705/4 | 2002/0082990 A1 | 6/2002 | Jones |
| 7,729,925 B2 | 6/2010 | Maritzen et al. | 2002/0087349 A1 | 7/2002 | Wong |
| 7,729,980 B2 | 6/2010 | Mittenzwei et al. | 2002/0087373 A1 | 7/2002 | Dickstein et al. |
| 7,742,970 B2 | 6/2010 | Thierer et al. | 2002/0091567 A1 | 7/2002 | Royston |
| 7,747,463 B1 | 6/2010 | Phillips et al. | 2002/0091632 A1 | 7/2002 | Turock et al. |

| | | |
|---|---|---|
| 2002/0091634 A1 | 7/2002 | Eubanks |
| 2002/0091649 A1 | 7/2002 | Anvekar et al. |
| 2002/0099586 A1 | 7/2002 | Bladen et al. |
| 2002/0099601 A1 | 7/2002 | Farrell |
| 2002/0099649 A1 | 7/2002 | Lee et al. |
| 2002/0099667 A1 | 7/2002 | Diamandis et al. |
| 2002/0103852 A1 | 8/2002 | Pushka |
| 2002/0107731 A1 | 8/2002 | Teng |
| 2002/0111859 A1 | 8/2002 | Sheldon et al. |
| 2002/0111860 A1 | 8/2002 | Jones |
| 2002/0111861 A1 | 8/2002 | Sakamoto et al. |
| 2002/0111886 A1 | 8/2002 | Chenevich et al. |
| 2002/0111891 A1 | 8/2002 | Hoffman et al. |
| 2002/0111916 A1 | 8/2002 | Coronna et al. |
| 2002/0116266 A1 | 8/2002 | Marshall |
| 2002/0116331 A1 | 8/2002 | Cataline et al. |
| 2002/0117541 A1 | 8/2002 | Biggar et al. |
| 2002/0120497 A1 | 8/2002 | King |
| 2002/0120571 A1 | 8/2002 | Maung et al. |
| 2002/0120846 A1 | 8/2002 | Stewart et al. |
| 2002/0123926 A1 | 9/2002 | Bushold et al. |
| 2002/0123946 A1 | 9/2002 | Haworth et al. |
| 2002/0123955 A1 | 9/2002 | Andreski et al. |
| 2002/0128916 A1 | 9/2002 | Beinecke |
| 2002/0129221 A1 | 9/2002 | Borgin et al. |
| 2002/0133401 A1 | 9/2002 | Mount et al. |
| 2002/0133461 A1 | 9/2002 | Ramachandran |
| 2002/0138409 A1* | 9/2002 | Bass ............................. 705/38 |
| 2002/0138418 A1 | 9/2002 | Zarin et al. |
| 2002/0143614 A1 | 10/2002 | MacLean et al. |
| 2002/0143621 A1 | 10/2002 | Donnelly et al. |
| 2002/0143626 A1 | 10/2002 | Voltmer et al. |
| 2002/0145039 A1 | 10/2002 | Carroll |
| 2002/0147633 A1 | 10/2002 | Rafizadeh |
| 2002/0147683 A1 | 10/2002 | Capobianco et al. |
| 2002/0147691 A1 | 10/2002 | Davis et al. |
| 2002/0152116 A1 | 10/2002 | Yan et al. |
| 2002/0152118 A1 | 10/2002 | Hadjigeorgis |
| 2002/0152168 A1 | 10/2002 | Neofytides et al. |
| 2002/0152179 A1 | 10/2002 | Racov |
| 2002/0156723 A1 | 10/2002 | Lilly et al. |
| 2002/0161630 A1 | 10/2002 | Kern et al. |
| 2002/0161641 A1 | 10/2002 | Quinlan et al. |
| 2002/0161699 A1 | 10/2002 | Okamoto et al. |
| 2002/0161702 A1 | 10/2002 | Milberger et al. |
| 2002/0165771 A1 | 11/2002 | Walker et al. |
| 2002/0165808 A1 | 11/2002 | Zamsky et al. |
| 2002/0165829 A1 | 11/2002 | Jones et al. |
| 2002/0169671 A1 | 11/2002 | Junger |
| 2002/0169719 A1 | 11/2002 | Dively et al. |
| 2002/0174011 A1 | 11/2002 | Sanchez et al. |
| 2002/0174018 A1 | 11/2002 | Bunger et al. |
| 2002/0174030 A1 | 11/2002 | Praisner et al. |
| 2002/0178025 A1 | 11/2002 | Hansen et al. |
| 2002/0178056 A1 | 11/2002 | Lim |
| 2002/0178063 A1 | 11/2002 | Gravelle et al. |
| 2002/0178112 A1 | 11/2002 | Goeller et al. |
| 2002/0187825 A1 | 12/2002 | Tracy et al. |
| 2002/0188478 A1 | 12/2002 | Breeland et al. |
| 2002/0188509 A1 | 12/2002 | Ariff et al. |
| 2002/0188511 A1 | 12/2002 | Johnson et al. |
| 2002/0188565 A1 | 12/2002 | Nakamura et al. |
| 2002/0190123 A1 | 12/2002 | Anvekar et al. |
| 2002/0194071 A1 | 12/2002 | Yoshizaki et al. |
| 2002/0194081 A1 | 12/2002 | Perkowski |
| 2002/0194098 A1 | 12/2002 | Stiff et al. |
| 2002/0194119 A1 | 12/2002 | Wright et al. |
| 2002/0198803 A1 | 12/2002 | Rowe |
| 2002/0198807 A1 | 12/2002 | Kobayashi et al. |
| 2002/0198848 A1 | 12/2002 | Michener |
| 2003/0004803 A1 | 1/2003 | Glover et al. |
| 2003/0004809 A1 | 1/2003 | Palcic et al. |
| 2003/0005288 A1 | 1/2003 | Moskowitz et al. |
| 2003/0009358 A1 | 1/2003 | Greenfeld et al. |
| 2003/0009374 A1 | 1/2003 | Moodie et al. |
| 2003/0009379 A1 | 1/2003 | Narasimhan et al. |
| 2003/0009393 A1 | 1/2003 | Norris |
| 2003/0010831 A1 | 1/2003 | Ye |
| 2003/0018523 A1 | 1/2003 | Rappaport et al. |
| 2003/0018613 A1 | 1/2003 | Oytac |
| 2003/0023557 A1 | 1/2003 | Moore |
| 2003/0028483 A1 | 2/2003 | Sanders et al. |
| 2003/0031321 A1 | 2/2003 | Mages |
| 2003/0033211 A1 | 2/2003 | Haines et al. |
| 2003/0033246 A1 | 2/2003 | Slater |
| 2003/0033252 A1 | 2/2003 | Buttridge et al. |
| 2003/0034388 A1 | 2/2003 | Routhenstein et al. |
| 2003/0036952 A1 | 2/2003 | Panttaja et al. |
| 2003/0040927 A1 | 2/2003 | Sato et al. |
| 2003/0040959 A1 | 2/2003 | Fei et al. |
| 2003/0040964 A1 | 2/2003 | Lacek |
| 2003/0046542 A1 | 3/2003 | Chen et al. |
| 2003/0048888 A1 | 3/2003 | Hopper et al. |
| 2003/0050831 A1 | 3/2003 | Klayh |
| 2003/0055780 A1 | 3/2003 | Hansen et al. |
| 2003/0055782 A1 | 3/2003 | Slater |
| 2003/0061093 A1 | 3/2003 | Todd |
| 2003/0061097 A1 | 3/2003 | Walker et al. |
| 2003/0061098 A1 | 3/2003 | Meyer |
| 2003/0061157 A1 | 3/2003 | Hirka et al. |
| 2003/0061168 A1 | 3/2003 | Routhenstein |
| 2003/0065618 A1 | 4/2003 | VanDeBoe, Jr. |
| 2003/0065624 A1 | 4/2003 | James et al. |
| 2003/0069808 A1 | 4/2003 | Cardno |
| 2003/0074167 A1 | 4/2003 | Browne et al. |
| 2003/0074290 A1 | 4/2003 | Clore |
| 2003/0078815 A1 | 4/2003 | Parsons |
| 2003/0078881 A1 | 4/2003 | Elliott et al. |
| 2003/0083933 A1 | 5/2003 | McAlear |
| 2003/0085272 A1 | 5/2003 | Andrews et al. |
| 2003/0085286 A1 | 5/2003 | Kelley et al. |
| 2003/0088462 A1 | 5/2003 | Carrither et al. |
| 2003/0088470 A1 | 5/2003 | Cuervo |
| 2003/0097298 A1 | 5/2003 | Klimpl et al. |
| 2003/0105688 A1 | 6/2003 | Brown et al. |
| 2003/0105689 A1 | 6/2003 | Chandak et al. |
| 2003/0105714 A1 | 6/2003 | Alacron et al. |
| 2003/0110111 A1 | 6/2003 | Nalebuff et al. |
| 2003/0115100 A1 | 6/2003 | Teicher |
| 2003/0120544 A1 | 6/2003 | Gritzbach et al. |
| 2003/0120571 A1 | 6/2003 | Blagg |
| 2003/0125969 A1 | 7/2003 | Kizer et al. |
| 2003/0126011 A1 | 7/2003 | Bryman et al. |
| 2003/0130940 A1 | 7/2003 | Hansen et al. |
| 2003/0130948 A1 | 7/2003 | Algiene et al. |
| 2003/0135453 A1 | 7/2003 | Caulfield et al. |
| 2003/0135459 A1 | 7/2003 | Abelman et al. |
| 2003/0144887 A1 | 7/2003 | Debber |
| 2003/0144902 A1 | 7/2003 | Bowie |
| 2003/0149629 A1 | 8/2003 | Claridge et al. |
| 2003/0149660 A1 | 8/2003 | Canfield |
| 2003/0154125 A1 | 8/2003 | Mittal et al. |
| 2003/0154163 A1 | 8/2003 | Phillips et al. |
| 2003/0158776 A1 | 8/2003 | Landesmann |
| 2003/0158782 A1 | 8/2003 | Thomson et al. |
| 2003/0158818 A1 | 8/2003 | George et al. |
| 2003/0163416 A1 | 8/2003 | Kitajima |
| 2003/0167218 A1 | 9/2003 | Field et al. |
| 2003/0167220 A1 | 9/2003 | Schoen et al. |
| 2003/0171992 A1 | 9/2003 | Blagg et al. |
| 2003/0182218 A1 | 9/2003 | Blagg |
| 2003/0182246 A1 | 9/2003 | Johnson et al. |
| 2003/0182247 A1 | 9/2003 | Mobed et al. |
| 2003/0187787 A1 | 10/2003 | Freund |
| 2003/0195805 A1 | 10/2003 | Storey |
| 2003/0195842 A1 | 10/2003 | Reece |
| 2003/0200141 A1 | 10/2003 | Robison |
| 2003/0200142 A1 | 10/2003 | Hicks et al. |
| 2003/0200143 A9 | 10/2003 | Walker et al. |
| 2003/0200179 A1 | 10/2003 | Kwan |
| 2003/0204421 A1 | 10/2003 | Houle et al. |
| 2003/0205616 A1 | 11/2003 | Graves |
| 2003/0205617 A1 | 11/2003 | Allen et al. |
| 2003/0208400 A1 | 11/2003 | Kuo et al. |
| 2003/0208439 A1 | 11/2003 | Rast |
| 2003/0212630 A1 | 11/2003 | Kahr |
| 2003/0213843 A1 | 11/2003 | Jackson |
| 2003/0216947 A1 | 11/2003 | Callen et al. |

| | | | | | | |
|---|---|---|---|---|---|---|
| 2003/0216964 A1 | 11/2003 | MacLean et al. | | 2004/0249764 A1 | 12/2004 | Delitz et al. |
| 2003/0216967 A1 | 11/2003 | Williams | | 2004/0252012 A1 | 12/2004 | Beenau et al. |
| 2003/0216998 A1 | 11/2003 | Chang et al. | | 2005/0004839 A1 | 1/2005 | Bakker et al. |
| 2003/0217003 A1 | 11/2003 | Weinflash et al. | | 2005/0004864 A1 | 1/2005 | Lent et al. |
| 2003/0217005 A1 | 11/2003 | Drummond et al. | | 2005/0006286 A1 | 1/2005 | Fery et al. |
| 2003/0217329 A1 | 11/2003 | Good | | 2005/0021353 A1 | 1/2005 | Aviles et al. |
| 2003/0218062 A1 | 11/2003 | Noriega et al. | | 2005/0021363 A1 | 1/2005 | Stimson et al. |
| 2003/0218066 A1 | 11/2003 | Fernandes et al. | | 2005/0021405 A1 | 1/2005 | Agarwal |
| 2003/0220834 A1 | 11/2003 | Leung et al. | | 2005/0021457 A1 | 1/2005 | Johnson et al. |
| 2003/0222136 A1 | 12/2003 | Bolle et al. | | 2005/0023346 A1 | 2/2005 | Bakker et al. |
| 2003/0225618 A1 | 12/2003 | Hessburg et al. | | 2005/0033619 A1 | 2/2005 | Barnes et al. |
| 2003/0225619 A1 | 12/2003 | Dokken et al. | | 2005/0033637 A1 | 2/2005 | Underwood |
| 2003/0229525 A1 | 12/2003 | Callahan et al. | | 2005/0035192 A1 | 2/2005 | Bonalle et al. |
| 2003/0229579 A1 | 12/2003 | Savage et al. | | 2005/0035847 A1 | 2/2005 | Bonalle et al. |
| 2003/0229590 A1 | 12/2003 | Byrne et al. | | 2005/0040242 A1 | 2/2005 | Beenau et al. |
| 2003/0233255 A1 | 12/2003 | Dirienzo | | 2005/0049950 A1 | 3/2005 | Johnson |
| 2003/0233278 A1 | 12/2003 | Marshall | | 2005/0049965 A1 | 3/2005 | Jen |
| 2003/0236712 A1 | 12/2003 | Antonucci et al. | | 2005/0055270 A1 | 3/2005 | Broe |
| 2004/0002916 A1 | 1/2004 | Timmerman et al. | | 2005/0060260 A1 | 3/2005 | Masuda et al. |
| 2004/0006487 A1 | 1/2004 | Tari | | 2005/0065877 A1 | 3/2005 | Cleary et al. |
| 2004/0010447 A1 | 1/2004 | Asayama | | 2005/0071225 A1 | 3/2005 | Bortolin et al. |
| 2004/0010462 A1 | 1/2004 | Moon et al. | | 2005/0071226 A1 | 3/2005 | Nguyen et al. |
| 2004/0015394 A1 | 1/2004 | Mok et al. | | 2005/0071227 A1 | 3/2005 | Hammad et al. |
| 2004/0024693 A1 | 2/2004 | Lawrence | | 2005/0075889 A1 | 4/2005 | Gomes et al. |
| 2004/0029569 A1 | 2/2004 | Khan et al. | | 2005/0077349 A1 | 4/2005 | Bonalle et al. |
| 2004/0039686 A1 | 2/2004 | Klebanoff | | 2005/0077350 A1 | 4/2005 | Courtion et al. |
| 2004/0044606 A1 | 3/2004 | Buttridge et al. | | 2005/0080672 A1 | 4/2005 | Courtion et al. |
| 2004/0049452 A1 | 3/2004 | Blagg | | 2005/0086103 A1 | 4/2005 | Agura et al. |
| 2004/0054619 A1 | 3/2004 | Watson et al. | | 2005/0086160 A1 | 4/2005 | Wong et al. |
| 2004/0059952 A1 | 3/2004 | Newport et al. | | 2005/0086166 A1 | 4/2005 | Monk et al. |
| 2004/0064332 A1 | 4/2004 | Zou et al. | | 2005/0091104 A1 | 4/2005 | Abraham |
| 2004/0064401 A1 | 4/2004 | Palaghita et al. | | 2005/0091492 A1 | 4/2005 | Benson et al. |
| 2004/0064402 A1 | 4/2004 | Dreyer et al. | | 2005/0096976 A1 | 5/2005 | Nelms |
| 2004/0078324 A1 | 4/2004 | Lonnberg et al. | | 2005/0097033 A1 | 5/2005 | Pretell et al. |
| 2004/0078328 A1 | 4/2004 | Talbert et al. | | 2005/0102178 A1 | 5/2005 | Phillips et al. |
| 2004/0078332 A1 | 4/2004 | Ferguson et al. | | 2005/0102228 A1 | 5/2005 | Srinivasan et al. |
| 2004/0088236 A1 | 5/2004 | Manning | | 2005/0108064 A1* | 5/2005 | Castleman et al. ............... 705/4 |
| 2004/0088238 A1 | 5/2004 | Gilson et al. | | 2005/0108090 A1 | 5/2005 | Takeda et al. |
| 2004/0093296 A1 | 5/2004 | Phelan et al. | | 2005/0108102 A1 | 5/2005 | York |
| 2004/0093303 A1 | 5/2004 | Picciallo | | 2005/0108151 A1 | 5/2005 | York |
| 2004/0094624 A1 | 5/2004 | Fernandes et al. | | 2005/0108152 A1 | 5/2005 | Tsoa-Lee et al. |
| 2004/0103431 A1 | 5/2004 | Davenport et al. | | 2005/0114883 A1 | 5/2005 | Nagai et al. |
| 2004/0107161 A1 | 6/2004 | Tanaka et al. | | 2005/0119938 A1 | 6/2005 | Smith et al. |
| 2004/0111363 A1 | 6/2004 | Trench et al. | | 2005/0119979 A1 | 6/2005 | Murashita |
| 2004/0111371 A1 | 6/2004 | Friedman | | 2005/0125259 A1 | 6/2005 | Annappindi |
| 2004/0117202 A1 | 6/2004 | Winklevoss et al. | | 2005/0125292 A1 | 6/2005 | Kassab et al. |
| 2004/0118914 A1 | 6/2004 | Smith et al. | | 2005/0125295 A1 | 6/2005 | Tidwell et al. |
| 2004/0122697 A1 | 6/2004 | Becerra et al. | | 2005/0125296 A1 | 6/2005 | Tidwell et al. |
| 2004/0122736 A1 | 6/2004 | Strock et al. | | 2005/0125315 A1 | 6/2005 | Munoz et al. |
| 2004/0128186 A1 | 7/2004 | Breslin et al. | | 2005/0125337 A1 | 6/2005 | Tidwell et al. |
| 2004/0128195 A1 | 7/2004 | Sorem | | 2005/0125338 A1 | 6/2005 | Tidwell et al. |
| 2004/0128217 A1 | 7/2004 | Friedman et al. | | 2005/0125339 A1 | 6/2005 | Tidwell et al. |
| 2004/0128248 A1 | 7/2004 | Fujihara et al. | | 2005/0125350 A1 | 6/2005 | Tidwell et al. |
| 2004/0133787 A1 | 7/2004 | Doughty et al. | | 2005/0125351 A1 | 6/2005 | Tidwell et al. |
| 2004/0138991 A1 | 7/2004 | Song et al. | | 2005/0125360 A1 | 6/2005 | Tidwell et al. |
| 2004/0143526 A1 | 7/2004 | Monasterio et al. | | 2005/0131761 A1 | 6/2005 | Trika et al. |
| 2004/0149544 A1 | 8/2004 | Dal Ferro | | 2005/0131792 A1 | 6/2005 | Rowe |
| 2004/0158517 A1 | 8/2004 | Mahaney et al. | | 2005/0135593 A1 | 6/2005 | Becerra et al. |
| 2004/0159700 A1 | 8/2004 | Khan et al. | | 2005/0137982 A1 | 6/2005 | Michelassi et al. |
| 2004/0172350 A1 | 9/2004 | Atkinson et al. | | 2005/0144071 A1 | 6/2005 | Monahan et al. |
| 2004/0172358 A1 | 9/2004 | Lent et al. | | 2005/0144074 A1 | 6/2005 | Fredregill et al. |
| 2004/0177036 A1 | 9/2004 | Nutahara et al. | | 2005/0144105 A1 | 6/2005 | Czyzewski |
| 2004/0181441 A1 | 9/2004 | Fung et al. | | 2005/0144143 A1 | 6/2005 | Freiberg |
| 2004/0186773 A1 | 9/2004 | George et al. | | 2005/0149386 A1 | 7/2005 | Agura et al. |
| 2004/0193539 A1 | 9/2004 | Sullivan | | 2005/0149393 A1 | 7/2005 | Leof |
| 2004/0193540 A1 | 9/2004 | Brown et al. | | 2005/0149440 A1 | 7/2005 | Michelassi et al. |
| 2004/0199406 A1 | 10/2004 | Owens et al. | | 2005/0154664 A1 | 7/2005 | Guy et al. |
| 2004/0210498 A1 | 10/2004 | Freund | | 2005/0159986 A1 | 7/2005 | Breeland et al. |
| 2004/0210531 A1 | 10/2004 | Barron et al. | | 2005/0160003 A1 | 7/2005 | Berardi et al. |
| 2004/0215507 A1 | 10/2004 | Levitt et al. | | 2005/0160051 A1 | 7/2005 | Johnson |
| 2004/0232223 A1 | 11/2004 | Beenau et al. | | 2005/0167342 A1 | 8/2005 | Vullriede et al. |
| 2004/0236688 A1 | 11/2004 | Bozeman | | 2005/0167488 A1 | 8/2005 | Higgins et al. |
| 2004/0239481 A1 | 12/2004 | Beenau | | 2005/0171839 A1 | 8/2005 | Corriere |
| 2004/0242308 A1 | 12/2004 | Gray | | 2005/0171842 A1 | 8/2005 | Tien et al. |
| 2004/0243468 A1 | 12/2004 | Cohagan et al. | | 2005/0171901 A1 | 8/2005 | Rosenblatt et al. |
| 2004/0243506 A1 | 12/2004 | Das | | 2005/0177503 A1 | 8/2005 | Thomas |
| 2004/0249689 A1 | 12/2004 | Naraki et al. | | 2005/0177508 A1 | 8/2005 | Pembroke |
| 2004/0249710 A1 | 12/2004 | Smith et al. | | 2005/0177523 A1 | 8/2005 | Weiss et al. |
| 2004/0249712 A1 | 12/2004 | Brown et al. | | 2005/0179251 A1 | 8/2005 | Wagoner et al. |

| | | |
|---|---|---|
| 2005/0182654 A1 | 8/2005 | Abolfathi et al. |
| 2005/0182735 A1 | 8/2005 | Zager et al. |
| 2005/0187820 A1 | 8/2005 | Mohan |
| 2005/0189427 A1 | 9/2005 | Brown et al. |
| 2005/0192862 A1 | 9/2005 | Modi |
| 2005/0197904 A1 | 9/2005 | Baron et al. |
| 2005/0199705 A1 | 9/2005 | Beck et al. |
| 2005/0199708 A1 | 9/2005 | Friedman |
| 2005/0203824 A1 | 9/2005 | Freud et al. |
| 2005/0203857 A1 | 9/2005 | Friedman |
| 2005/0205666 A1 | 9/2005 | Ward et al. |
| 2005/0206499 A1 | 9/2005 | Fisher |
| 2005/0209917 A1 | 9/2005 | Anderson et al. |
| 2005/0216346 A1 | 9/2005 | Kusumoto et al. |
| 2005/0216888 A1 | 9/2005 | Drummond et al. |
| 2005/0222906 A1 | 10/2005 | Chen |
| 2005/0234769 A1 | 10/2005 | Jain et al. |
| 2005/0234771 A1 | 10/2005 | Register et al. |
| 2005/0234773 A1 | 10/2005 | Hirst et al. |
| 2005/0234789 A1 | 10/2005 | Czyzewski et al. |
| 2005/0240474 A1 | 10/2005 | Li |
| 2005/0240477 A1 | 10/2005 | Friday et al. |
| 2005/0242179 A1 | 11/2005 | Warwick |
| 2005/0246289 A1 | 11/2005 | Alexander et al. |
| 2005/0246627 A1 | 11/2005 | Sayed |
| 2005/0251446 A1 | 11/2005 | Jiang et al. |
| 2005/0251470 A1 | 11/2005 | Sullivan |
| 2005/0251478 A1 | 11/2005 | Yanavi |
| 2005/0256794 A1 | 11/2005 | Colby |
| 2005/0256802 A1 | 11/2005 | Ammermann et al. |
| 2005/0261916 A1 | 11/2005 | McCall et al. |
| 2005/0261995 A1 | 11/2005 | Phelan |
| 2005/0267800 A1 | 12/2005 | Tietzen et al. |
| 2005/0269396 A1 | 12/2005 | Schofield |
| 2005/0273386 A1 | 12/2005 | Weidner |
| 2005/0273387 A1 | 12/2005 | Previdi |
| 2005/0273425 A1 | 12/2005 | Yamazaki |
| 2005/0278215 A1 | 12/2005 | Seele, Jr. |
| 2005/0283429 A1 | 12/2005 | Bates et al. |
| 2005/0288998 A1 | 12/2005 | Verma et al. |
| 2005/0289003 A1 | 12/2005 | Thompson et al. |
| 2005/0289044 A1* | 12/2005 | Breslin et al. ............... 705/38 |
| 2006/0004629 A1 | 1/2006 | Neemann et al. |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0015463 A1 | 1/2006 | Gupta et al. |
| 2006/0020507 A1 | 1/2006 | Sagey |
| 2006/0020542 A1 | 1/2006 | Litle et al. |
| 2006/0026073 A1 | 2/2006 | Kenny et al. |
| 2006/0026092 A1 | 2/2006 | Klein et al. |
| 2006/0031718 A1 | 2/2006 | Thornhill et al. |
| 2006/0036543 A1 | 2/2006 | Blagg et al. |
| 2006/0036553 A1 | 2/2006 | Gupta et al. |
| 2006/0039733 A1 | 2/2006 | Meyerhofer |
| 2006/0041540 A1 | 2/2006 | Shannon |
| 2006/0047573 A1 | 3/2006 | Mitchell et al. |
| 2006/0047589 A1 | 3/2006 | Grau |
| 2006/0053056 A1 | 3/2006 | Alspach-Goss et al. |
| 2006/0064329 A1 | 3/2006 | Abolfathi et al. |
| 2006/0074794 A1 | 4/2006 | Nespola, Jr. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0085334 A1 | 4/2006 | Murphy |
| 2006/0093123 A1 | 5/2006 | Becerra et al. |
| 2006/0095350 A1 | 5/2006 | Hall et al. |
| 2006/0106696 A1 | 5/2006 | Carlson |
| 2006/0116903 A1* | 6/2006 | Becerra ..................... 705/2 |
| 2006/0116995 A1 | 6/2006 | Strayer et al. |
| 2006/0122918 A1 | 6/2006 | Graboske et al. |
| 2006/0131869 A1 | 6/2006 | Brignull |
| 2006/0136231 A1 | 6/2006 | Thomas |
| 2006/0143077 A1 | 6/2006 | Prorock |
| 2006/0143117 A1 | 6/2006 | Chigira et al. |
| 2006/0149671 A1 | 7/2006 | Nix et al. |
| 2006/0155628 A1 | 7/2006 | Horowitz |
| 2006/0157557 A1 | 7/2006 | Lee et al. |
| 2006/0161478 A1 | 7/2006 | Turner et al. |

| | | |
|---|---|---|
| 2006/0195390 A1 | 8/2006 | Rusk et al. |
| 2006/0224480 A1 | 10/2006 | Bent et al. |
| 2006/0242057 A1 | 10/2006 | Velarde |
| 2006/0249574 A1 | 11/2006 | Brown et al. |
| 2006/0251478 A1 | 11/2006 | Desmeules |
| 2006/0259364 A1 | 11/2006 | Strock et al. |
| 2006/0259390 A1 | 11/2006 | Rosenberger |
| 2006/0261927 A1 | 11/2006 | Kelly et al. |
| 2006/0289636 A1 | 12/2006 | Hoblit |
| 2007/0020443 A1 | 1/2007 | Lo |
| 2007/0034700 A1 | 2/2007 | Poidomani et al. |
| 2007/0038515 A1 | 2/2007 | Postrel |
| 2007/0063025 A1 | 3/2007 | Blossom |
| 2007/0078719 A1 | 4/2007 | Schmitt et al. |
| 2007/0083461 A1 | 4/2007 | Andalib et al. |
| 2007/0118470 A1 | 5/2007 | Warren et al. |
| 2007/0124227 A1 | 5/2007 | Dembo |
| 2007/0136211 A1 | 6/2007 | Brown et al. |
| 2007/0156530 A1 | 7/2007 | Schmitt et al. |
| 2007/0203825 A1 | 8/2007 | Hanifin et al. |
| 2007/0208671 A1 | 9/2007 | Brown et al. |
| 2007/0215688 A1 | 9/2007 | Routhenstein |
| 2007/0226097 A1 | 9/2007 | Keechle |
| 2007/0265924 A1 | 11/2007 | Schwarz |
| 2008/0005018 A1 | 1/2008 | Powell |
| 2008/0010202 A1 | 1/2008 | Schwarz |
| 2008/0019281 A1 | 1/2008 | Liger et al. |
| 2008/0027841 A1 | 1/2008 | Eder |
| 2008/0133350 A1 | 6/2008 | White et al. |
| 2008/0177659 A1 | 7/2008 | Lacey et al. |
| 2008/0187770 A1 | 8/2008 | Funicelli et al. |
| 2008/0215470 A1 | 9/2008 | Sengupta et al. |
| 2008/0230600 A1 | 9/2008 | Black et al. |
| 2008/0245865 A1 | 10/2008 | Mosteller |
| 2008/0262915 A1 | 10/2008 | Gojkovic et al. |
| 2008/0277465 A1 | 11/2008 | Pletz et al. |
| 2008/0288396 A1 | 11/2008 | Siggers et al. |
| 2008/0301041 A1 | 12/2008 | Bruk |
| 2009/0043651 A1 | 2/2009 | Schwarz |
| 2009/0048972 A1 | 2/2009 | Bierer et al. |
| 2009/0063202 A1 | 3/2009 | Becerra et al. |
| 2009/0112639 A1 | 4/2009 | Beaver |
| 2009/0132312 A1 | 5/2009 | Reinheimer et al. |
| 2009/0150370 A1 | 6/2009 | Christensen et al. |
| 2009/0157437 A1 | 6/2009 | Becerra et al. |
| 2009/0171778 A1 | 7/2009 | Powell |
| 2009/0230195 A1 | 9/2009 | Lasch et al. |
| 2009/0240620 A1 | 9/2009 | Kendrick et al. |
| 2009/0242645 A1 | 10/2009 | Komatsu et al. |
| 2009/0250522 A1 | 10/2009 | Williams et al. |
| 2009/0261161 A1 | 10/2009 | Blossom |
| 2009/0265275 A1 | 10/2009 | Everhart |
| 2009/0271853 A1 | 10/2009 | Everhart |
| 2009/0313106 A1 | 12/2009 | Taylor et al. |
| 2009/0313110 A1 | 12/2009 | Asai et al. |
| 2010/0030675 A1 | 2/2010 | Hanan et al. |
| 2010/0030697 A1 | 2/2010 | Goodrich et al. |
| 2010/0057551 A1 | 3/2010 | Blaisdell |
| 2010/0057553 A1 | 3/2010 | Ameiss et al. |
| 2010/0114779 A1 | 5/2010 | Noles |

FOREIGN PATENT DOCUMENTS

| | | |
|---|---|---|
| EP | 0843292 A2 | 5/1998 |
| EP | 0855659 | 7/1998 |
| EP | 0590861 | 1/2001 |
| JP | 53-118104 | 10/1978 |
| JP | 64-87397 | 3/1989 |
| JP | 3-114879 | 5/1991 |
| JP | 4-073193 | 3/1992 |
| JP | 4-201392 | 7/1992 |
| JP | 5-011676 | 1/1993 |
| JP | 8-080680 | 3/1996 |
| JP | 8-096098 | 4/1996 |
| JP | 10-116016 | 5/1998 |
| JP | 2000-113151 | 4/2000 |
| JP | 2002-259933 | 9/2002 |
| JP | 2002-366015 | 12/2002 |
| JP | 2005-246658 | 9/2005 |
| JP | 2008-015071 | 1/2008 |

| | | |
|---|---|---|
| WO | 97/20692 | 6/1997 |
| WO | 98/10368 | 3/1998 |
| WO | 98/58345 | 12/1998 |
| WO | 99/54841 | 10/1999 |
| WO | 01/11532 | 2/2001 |
| WO | 01/69347 | 9/2001 |
| WO | 01/69347 A2 | 9/2001 |
| WO | 01/69347 A3 | 9/2001 |
| WO | 01/88659 | 11/2001 |
| WO | 2009/023817 | 2/2004 |
| WO | 2004/027564 A2 | 4/2004 |
| WO | 2004/040419 | 5/2004 |
| WO | 2004/114641 | 12/2004 |
| WO | 2005/101975 | 11/2005 |
| WO | 2006/060370 | 6/2006 |
| WO | 2006/105092 | 10/2006 |
| WO | 2006/116772 | 11/2006 |
| WO | 2007/115725 | 10/2007 |
| WO | 2008/021381 | 2/2008 |
| WO | 2008/021382 | 2/2008 |

OTHER PUBLICATIONS

U.S. Appl. No. 12/645,927—Response/Amendment dated Oct. 27, 2010.
U.S. Appl. No. 12/645,927—Final Rejection dated Jan. 4, 2011.
U.S. Appl. No. 12/645,927—Response/Amendment dated Apr. 4, 2011.
U.S. Appl. No. 12/645,927—Non-Final Rejection dated Nov. 9, 2011.
U.S. Appl. No. 12/645,927—Response/Amendment dated Jan. 23, 2012.
U.S. Appl. No. 12/645,927—Final Rejection dated Aug. 2, 2012.
U.S. Appl. No. 13/076,699—Non-Final Rejection dated Oct. 19, 2011.
U.S. Appl. No. 13/076,699—Final Rejection dated Apr. 16, 2012.
U.S. Appl. No. 13/076,699—Non-Final Rejection dated Aug. 15, 2012.
U.S. Appl. No. 13/076,699—Allowed Claims—2012.
Abstract to 2007 JPMorgan Chase Disaster Response Card National Strategy Plan Abstract, Jan. 2007.
Alaska Housing Finance Corporation, Request for Information Banking Services, Quarterly Unaudited Financial Statements, Mar. 31, 2005 (89 pages) JPMC-ACS-00000143-231.
Allen et al., Overview of Smart Cards and the Industry, Smart Cards: Seizing Strategic Business Opportunities, Chapter 1, p. 2-20, Irwin Professional Publishing, 1997.
American Banker, Inc., NCNB to Become Biggest Bank in Visa Debit Card Program, The American Banker, Mar. 8, 1979.
American Bankers Association, The Bank Credit Card Business, 1996.
American Express Incentive Services, Incentive, Sep. 1996, p. 126.
Anonymous, Association of Inventive Gift Certificate Suppliers, Incentive, vol. 169, No. 8, pp. SS1-SS23, Aug. 1995.
Anonymous, Two Chips Can Be Better Than One, May 2001.
Authorization of Financial Agent and Terms of Performance, Debit Card Application for Houston, Texas, Sep. 1991, acs00277412.
Block, First Data Subsidiary Creates Payroll Card for the Bankless, LexisNexis Academic, Credit/Debit/ATMs, p. 10, Mar. 21, 1997.
Board of Governors of the Federal Reserve System—Report to the Congress on the Application of the Electronic Fund Transfer Act to Electronic Stored-Value Products, May 1997, acs00098020.
Bowen, Welfare Agencies Seek Aid From Smart Cards, Card Technology, vol. 7, No. 11 pp. 74-76 (2002).
Business Editors and Real Estate Writers, Business Editors and Real Estate Automotive Writers, Consumers Now Can Know What Loan Rate Offers to Expect Based on Their FICO Credit Score at MyFICO. com, Business Wire, New York, Mar. 6, 2002, p. 1.
Business Wire, Business Wire, Inc., Associates-Corp/AMOCO—Announce Plans to Offer Free Visa and MasterCard Accounts, Business Wire, Aug. 29, 1985.
CardTrak Online, Coca-Cola ATM Money Cards (Apr. 4, 1997) Web page at http://www.cardweb.com/cardtrak/news/cf_4a_97.html printed Apr. 7, 2009 ACS 012.
Cardweb.com, Daily Payment Card News, www.cardweb.com (2004).
Cheney, How Effective Were the Financial Safety Nets in the Aftermath of Katrina, HurricaneKatrinaJan06, Jan. 2006.
Claessens, et al., A Tangled World Wide Web of Security Issues, First Monday, retrieved from the internet at http://www.firstmonday.org/issues/issue7_3/claessens, retrieved from the Internet on Oct. 6, 2006.
D. O'Mahony, Electronic Payment System, 1997, Artech House, XP002137255, p. 7-11.
Davis, Merchants Unbound, Card Technology, Jun. 2004, vol. 9, No. 7, p. 36 (8 pages).
Debit and Stored Value Cards for Government: A Growing Trend but States Could Do More, A Survey and White paper of The EBT Industry Council, Nov. 2006.
Debit Card News—Paperless Trail Leads Debit to a Check-Free Payroll Program, vol. 3, No. 12, Dec. 16, 1997.
Debit Card Services—Invitation for Expressions of Interest, Jul. 1991, acs00277422.
Definition of Store-Value Card, Wikipedia, retrieved from the internet at http://en.wikipedia.org/wiki/Stored-value_card, retrieved from the internet on Apr. 16, 2007.
Direct Payment Card, International EBT Pilot Evaluation Pilot Evaluation—Argentina, Jan. 1996, acs00277456.
Dugas, Payroll May Ask Paper or Plastic?, USA Today, 3B, Aug. 14, 2001, 1 page.
Eight Keys to Making the Right Choice, Incentive, Dec. 1996, 9 pages.
E-Loan, A Better Way to Get a Loan—Frequently Asked Questions (FAQ), Apr. 7, 2001, eloan.com (web.archive.org/web/20010407063242/www.wheels.eloan.com/cgibin/show/autofa . . . ).
E-Loan, A Better Way to Get a Loan, AutoLoan webpage, Apr. 4, 2001, eloan.com (web.archive.org/web20010404223234/www.wheels.eloan.com/cgibin/autoloans?).
E-Loan, Auto Loan Rates (2001).
Exclusively Yours From Maritz . . . The MasterCard Card Ultimate Incentive, Incentive, Oct. 1995, 3 pages.
Feldman, Judy, Pay By Check Over The Phone Or Net, vol. 28, Issue 10, p. 178, Oct. 1, 1999.
FOIA # 09-02-12 Responsive Records Book #11, Mar. 12, 2009, acs00279715.
FOIA # 09-02-12 Responsive Records Book #2, Mar. 12, 2009, acs00277515.
FOIA # 09-02-12 Responsive Records Book #3, Mar. 12, 2009, acs00277531.
FOIA # 09-02-12 Responsive Records Book #5, Mar. 12, 2009, acs00278229.
FOIA # 09-02-12 Responsive Records Book #7, Mar. 12, 2009, acs00278754.
Frequently asked questions, ECARD, www.eregard.com, printed Sep. 23, 2001, 7 pages.
Haddad et al., Congratulations, Grads—You're Bankrupt A Marketing Blitz Buries Kids in Plastic and Debt, Issue 3733, p. 48 (2001).
Hamey, Kenneth, Home Asset Management Accounts Link Mortgages Equity Lines, Oct. 5, 2002.
Hargreaves, The Evaluation of the Expanded EBT Demonstration in Maryland, Final Report, May 1994, acs00092018.
Hight, Jim, Consulting Services, www.strategies-tactics.com, Jan. 24, 1997.
Incentive gift Card: Another way to give the gift of choice!, Incentive, Aug. 1995, 2 pages.
JPMorgan Chase, In Time of Need: A National Strategy for Disaster Response Cards, Treasury Services—Public Sector, Jan. 26, 2007.
Judy Quinn, Incentive Cards Explained, Incentive, Dec. 1995, 5 pages.
Kenneth Hein, What's the Deal?, Incentive, Jul. 1998, 7 pages.
Kibble-Smith, House Committee on Ways and Means, Statement of Brian Kibble-Smith, JPMorgan Chase Treasury Services, Apr. 5, 2006.
Kiley, Branded!, Catalog Age, Jun. 1996, vol. 3, No. 6, p. 77 (4 pages).
Kilian-Kehr, Mobile Security with Smartcards, Dissertation, Apr. 8, 2002.

Kleege, Visa Unveils CoBranding Offensive (Visa International, Visa U.S.A. Inc.), American Banker, v. 159, n. 43, Mar. 4, 1994 (www.dialogclassic.com/MainFrame.jsp, pp. 1-3).
Lennox, Don't Be Tempted By The Urge To Splurge Zero Rates Sound Great But You'll Pay Dearly In The End (2001).
Lewis, Mortgage Lending Optimized, Internet Week, Issue 858, Apr. 23, 2001.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
LexisNexis Academic, On the Way, vol. 1997, No. 74, p. 2, Mar. 31, 1997.
Maritz, Incentive, Jun. 1996, p. 111.
McMonagle, Chapter VII—Cash Balance Plans in a Traditional Defined Benefit World, as found on google.scholar (dev.soa.org, Jan. 2002), www.soa.org/.../monographs/retirement-systems/cash-balance-symposium/2002/january/m-rs02-3-07.pdf—May 7, 2009.
Meridian Award Cards, JA8251, Jul. 2000.
Modification # 1 to the Authorization of the Financial Agent and Terms of Performance, Sep. 30, 1993, acs00277482.
Modification # 2 to the Authorization of the Financial Agent and Terms of Performance, Mar. 25, 1994, acs00277490.
Modification # 3 to the Authorization of the Financial Agent and Terms of Performance, Feb. 25, 1995, acs00277500.
Modification # 4 to the Authorization of the Financial Agent and Terms of Performance, Apr. 1, 1996, acs00277507.
National Automated Clearing House Association (NACHA), Business-to-Business EIPP Presentment Models and Payment Options Part One—Presentment Models, Jan. 2001, Counsel for Electronic Billing and Payment, (cebp.nacha.org).
Nilson, The Nilson Report (1998).
American Express and Starwood Launch the New Starwood Preferred Guest (SM) Credit Card from American Express, Jun. 19, 2001, PR Newswire, p. 1.
Smart Cards Forging Into Credit Card Market (1995).
Nora Wood, Corporate Spotlight, Incentive, Dec. 1997, 4 pages.
Nora Wood, The Power of the Card, Incentive, Jul. 1997, 6 pages.
O'Conner, Maritz Gets MasterCard's Stamp of Approval, Business Travel News, Aug. 19, 1996, 2 pages.
Ostroff, Guide to Buying New Cars Used Cars Dealer Scams, Feb. 2, 2001, CarBuyingTips.com.
Paper or Plastic? With these three incentives, The Choice is Yours, Incentive, Feb. 1996, 2 pages.
Plotnick, Bakersfield California Investors Explore Buying Rental Property Apr. 11, 2004.
Power, Loehmann's Compiles Shopper Data Via Credit Card, vol. 28, No. 3, Jan. 7, 1998.
PR Newswire, Delta and American Express Introduce, Always Double Miles Feature on Delta SkyMiles® Cards, Oct. 2, 2000, PR Newswire, p. 1.
Press Release, Mar. 5, 2004, Payment Data Systems Files Patent on Debit Card Payment Solution, American City Business Journals, Inc., Mar. 5, 2004.
Pullar-Strecker, 'Kiwi card converts unlikely to lead smart revolution; Little support for changes to risk allocation' (2 Edition) Dominion. Wellington, New Zealand; Apr. 25, 2000, p. IT.6.
Quinn, For Many College Youths, Credit Cards Easy to Get, American Express article; St. Louise Post-Dispatch; Feb. 3, 1989.
Ramsaran, Co-Branded Cards Take Flight, Bank Systems & Technology, May 1, 2005, 52 (1 page).
Request for Information submitted to Department of Health and Human Services by JPMorgan Electronic Financial Services, Request for Information for EBT Services, Aug. 10, 2006.
Roberts, Fnb And Nedcor Launch Into The New Era Of Smart Card Banking Nov. 15, 1998.
Rolfe, Europe's Co-branding Boom, Credit Card Management, Jan. 2003, vol. 15, No. 11, p. 16 (4 pages).
Rossman, Kenneth, Summary Appraisal of Real Property, Feb. 13, 2002.
Sessums, Unbanked Citizens Draw Government Attention, vol. 9, No. 4, (1997) acs00280762.
Sherer, Deals & Deal Makers Web Ventures Seek To Facilitate Business Credit, Private Equity (1999).
Siegel et al., Accounting Handbook, Second Edition, 7 pgs. (1995).
Tah et al., Information Modeling for a Construction Project Risk Management System, Engineering Construction and Architectural Management, 2000, vol. 7, No. 2, pp. 107-119.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment: Overview, p. 10-20, 1998.
The State of Arkansas, Arkansas Code of 1987 Annotated (1987).
Thai Smart Card to Expand Abroad (Smart Loyalty's Smart Bonus Program has 300,000 Cardholders in Thailand, the company plans to expand into markets that include Australia and Malaysia), Cards International, n. 183 p. 5, Sep. 22, 1997, (www.d.
Vincent Alonzo, Incentive Marketing . . . Three If By Smart Card, Incentive Sep. 1995, p. 11.
Vivo Tech, ViVOtech, Inc. RF-Based Contactless Payment A more convenient way to pay, White Paper—Version 2.0, Apr. 2004.
Ward, New Debit Card is Introduced to Serve Unbanked Workers, News & Business, Jun. 23, 1999.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Wells Fargo Blazes New Trail for Homeowners, Oct. 6, 2002.
Wenninger et al., The Electronic Purse, Current Issues in Economics and Finance, vol. 1, No. 1, Apr. 1995, acs00098037.
Wolf, Harold A., Personal Finance (1981).
Wood et al., Electronic Transfer of Government Benefits, Federal Reserve Bulletin, pp. 203-217, Apr. 1997.
Yee, Bennet, Using Secure Coprocessors (1994).
Youll, James, Peer to Peer Transactions in Agent Mediated Electronic Commerce (2001).

* cited by examiner

UNIVERSAL PAYMENT PROTECTION

FIELD OF THE INVENTION

The present invention generally relates to a system for and method of protecting entities with financial obligations. More particularly, the invention relates to a single account equipped with the ability to handle multiple financial obligations when certain trigger events occur.

DESCRIPTION OF RELATED ART

The present application incorporates by reference in their entireties the following patents and pending patent applications: U.S. Pat. No. 6,615,190 to Slater entitled "Sponsor-Funded Stored Value Card", Pending U.S. patent application Ser. No. 10/268,763 to Slater entitled "Sponsor Funded Stored Value Card", U.S. Pat. No. 6,615,189 to Phillips et al. entitled "Debit Purchasing Of Stored Value Card For Use By And/Or Delivery To Others", U.S. patent application Ser. No. 10/681,148 to Ilijasic et al. entitled "System and Method for Insuring Financial Accounts", and U.S. patent application Ser. No. 10/681,148 to Ilijasic et al. entitled "System And Method For Insuring Financial Accounts".

SUMMARY OF THE INVENTION

According to an embodiment of the present invention, a system for and method of relieving an entity (e.g., an individual, a family, a business) from at least one payment obligation are disclosed. The embodiment includes receiving information relating to the entity and deciding whether to issue an account to the entity. The embodiment also includes issuing an account to the entity in response to the step of deciding. The embodiment further includes receiving data, the data being associated with at least one of the entity and the account. The data include: first information reflecting a trigger circumstance, the first information defining a potential future situation, and second information reflecting a benefit, the benefit being intended to address at least one payment obligation, where the payment obligation is not initially associated with the account. The embodiment further includes processing at least a portion of the data using at least one probabilistic computation, the probabilistic computation including at least one financial assessment associated with the trigger circumstance. The embodiment further includes receiving an indication that a trigger circumstance has occurred. The embodiment further includes comparing information in the indication to account information associated with the entity. The embodiment further includes determining, based on the account information associated with the entity and consistent with the data received from the entity, that the entity is entitled to the benefit. The embodiment further includes providing the benefit to the entity in accordance with the account information associated with the entity.

Various optional features of the above embodiment include the following. The embodiment may include a line of credit as the benefit. The line of credit may be intended to address any payment obligation. The line of credit may be restricted. The embodiment may include restricting who may receive funds from the line of credit. The line of credit may be intended for use against a financial obligation arising from a financial product. The method may include disposing of the benefit. The disposing may include debt deferment, debt suspension, debt cancellation, or debt forgiveness. The trigger event may be a loss of employment, divorce, disability, hospitalization, medical treatment, family leave, judicial proceedings, tax events, natural disasters, call to duty, fire, flood, marriage, child birth, child adoption, retirement, or death. The payment obligation may be a loan (e.g., mortgage), bill (e.g., health insurance bill, life insurance bill, rent, utility bill, hospital bill, credit card bill, car insurance bill), car payment (e.g., payment on a car loan or lease), retirement savings, penalty, fine, attorney fees, tax, other type of lease, line of credit, letter of credit payment, or child support. The embodiment may include a financial product such as a credit card, a stored value card, a demand deposit account, a letter of credit, or a line of credit. The embodiment may include a web page accessible by the entity, where the step of receiving data selected by the entity occurs via the website. The embodiment may include conveying to the entity, via the website, information reflecting at least one fee received from the entity. The embodiment may further comprise receiving an application from the entity, the application including the information relating to the entity, and accepting the application. The embodiment may further include receiving consideration. The consideration may include at least one fee received from the entity, at least a portion of the fee being associated with the benefit. The portion of the at least one fee associated with the benefit may include a flat fee, a lump sum fee, a percentage of a periodic obligation, a percentage of an outstanding debt, or a percentage of an average monthly balance. The consideration may include the entity obtaining an account. No compensation may be received in response to the step of issuing.

The embodiment may include receiving data selected by the entity. Such data, being associated with the account, may include third information reflecting a second trigger circumstance, the third information defining a potential future situation, and fourth information reflecting a second benefit, the second benefit being intended to address at least one payment obligation. Such an embodiment may further include receiving a request, the request indicating that a trigger circumstance has occurred, and comparing information in the request to account information associated with the entity. Such an embodiment may further include determining, based on the account information associated with the entity and consistent with the data received from the entity, that the entity is entitled to a triggered benefit, the triggered benefit being the benefit or the second benefit, and providing the triggered benefit to the entity in accordance with the account information associated with the entity.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION OF THE PREFERRED EMBODIMENTS

According to an embodiment of the present invention a universal clearinghouse account for payment protection is disclosed. The account is "universal" in the sense that it may be used to protect payment in any of a number of obligations, not limited to debts or obligations associated with the bank that issues the account. Thus, for example, the account may be used to defer a minimum monthly payment on a credit card that is not associated with the account. Such a deferral may be accomplished by issuing a line of credit to the accountholder, where the line of credit may only be used to pay minimum monthly payments on a particular credit card not associated with the account. Obligations (not limited to debts) that may be covered by the invention include, by way of non-limiting example: mortgage payments, secured and unsecured loans and lines of credit (e.g., business or consumer loans), education, credit cards (even credit cards not directly associated with the account or with the financial entity), vehicle payments (e.g., vehicle loans and vehicle leases), vehicle insurance, rent, lease, utilities (e.g., electricity, water, gas), retirement savings (e.g., 401k), penalties, fines, attorney fees, taxes, child support payments, hospital services, and any combination thereof. Any of these payments may be protected even if not initially associated with the account or financial institution. The account may include a credit card or line of credit, but is not limited to accounts that include such products.

According to certain embodiments of the present invention, a single account may provide payment protection for a plurality of financial obligations. Moreover, such embodiments may provide payment protection for obligations that are not initially associated with the account. By way of non-limiting example, certain embodiments of the present invention may include an account with a first bank that provides protection for: the minimum monthly payment on a credit card associated with a second bank, a mortgage payment where the mortgage is held by a third bank, a monthly payment into a 401K savings plan associated with a fourth bank, a car loan payment where the car loan is held by a fifth bank, and so on. In short, certain embodiments of the present invention may provide payment protection for any financial obligation whatsoever, regardless as to whether such obligation is associated with the account that provides the protection.

Figure 1:
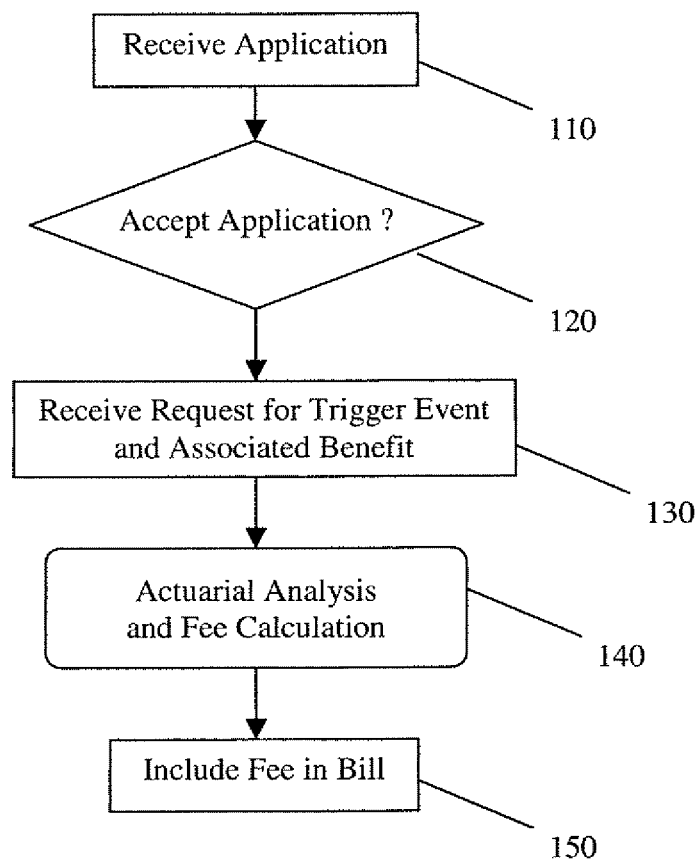
FIG. 1 is a flowchart illustrating account signup according to an embodiment of the present invention.

FIG. 1 is a flowchart illustrating account signup according to an embodiment of the present invention. Account signup may be accomplished by a variety of techniques. The first step 110 is for an entity to submit an application to the issuing bank. Although the term "issuing bank" is used herein, the entity that issues accounts in accordance with embodiments of the present invention is not limited to banks. By way of non-limiting example, banks, credit unions, savings institutions, finance companies, risk pools, or savings & loans may issue such accounts. Thus, the term "issuing bank" is meant to encompass any issuing entity. Further, the term "entity" as used herein, is meant to encompass, by way of non-limiting example, a consumer, a corporation, or a family.

Note that embodiments of the present invention are not limited to submission of the application by the entity. For example, in certain embodiments of the present invention, the application may be submitted by a third-party, such as, by way of non-limiting example, a mortgage holder.

The account associated with an embodiment of the present invention may be a pre-existing account, in which case an application will already be on record. For example, the account may be associated with a mortgage, loan, or other pre-existing financial product associated with the entity. Alternately, an entity may apply for an account by telephone, in person, mail, email or internet. An entity may first be offered an opportunity to obtain an account according to an embodiment of the present invention by solicitation through mail, telephone, email, or any other advertisement technique such as billboard, television ad, or print ad. For telephonic signup, an entity may be solicited by telephone, or the entity may initiate the contact him or herself by dialing a telephone number that has been provided by any of the above-referenced advertisement techniques, for example. For mail signup, the entity may fill out a form and return it in a pre-paid envelope. The entity may obtain such a faun, by way of non-limiting example, via its inclusion with a bill or other communication associated with a pre-existing account. For internet-based signup, the entity may visit a webpage and fill out a form. A link to such a webpage may appear on any content website or may be included in an emailed solicitation.

Once the entity (or other party) has submitted an application, the issuing bank determines whether it will accept 120 the application. Acceptance involves conventional risk-determination techniques, such as checking the applicant's credit. Further, the issuing bank may check its own records for the applicant should the applicant already be a customer of the issuing bank. Part of the determination typically involves screening the applicant according to normal screening procedures associated with any financial products that form part of the account. For example, for an embodiment of the present invention that includes a credit card, the acceptance process would typically include a screening of applicants similar or identical to a screening of applicants that would precede issuing such a credit card that is not associated with an embodiment of the present invention. For an embodiment of the present invention that includes a savings account only, the process will typically include the screening that an applicant would undergo upon application for a standard savings account. In sum, the financial product or products associated with an embodiment of the present invention typically define, in part, the screening process that an applicant will undergo. As discussed further below, such an initial screening process may be independent from a secondary screening process that is associated with requesting trigger events and their corresponding benefits.

Once the application is accepted, the customer may select trigger events and associated benefits 130. Note that in certain embodiments of the present invention, the accountholder may choose trigger events and associated benefits contemporaneously with his or her application submission 110. Trigger events generally initiate payment protection in accordance with certain embodiments of the present invention. Such events include, by way of non-limiting example, involuntary loss of employment, divorce, bankruptcy, disability, death judicial proceedings, tax events, natural disasters, and hospitalization. The accountholder may select trigger events from a list of possibilities that are displayed to the accountholder via, by way of non-limiting example, the internet, email, traditional mail, or telephone. Alternately, or in addition, the customer may define a trigger event him or herself. The customer may select any number of trigger events.

Benefits available according to certain embodiments of the present invention include deferring mandatory payments (e.g., monthly minimum payments) for a certain amount of time and without incurring interest, and/or extending one or more lines of credit (which may be done automatically by, e.g., via wire transfer to an account, adding credit to a credit card, or by adding to or distributing a stored value card). The type of protection invoked upon a trigger event may depend on the particular type of trigger event itself. Benefits may survive death of the accountholder.

Other types of benefits include one or more lines of credit. Such lines of credit may be limited to certain merchants by, for example, making the money available on the card associated with the account and limiting the card for use with particular merchants via a merchant code. Alternately, or in addition, certain embodiments of the invention may extend a generic line of credit, such that a trigger event causes a line of credit of a particular amount to be extended for any use whatsoever. In either the limited or generic case, a line of credit may be automatically entered onto the balance of a card associated with the account such as a credit or stored value card. Lines of credit extended as benefits according to certain embodiments of the present inventions may be drawn upon to retire up to a certain number of full or partial periodic payment obligations and/or full or partial debt balances.

A benefit may include a line of credit specifically targeted to paying obligations associated with a financial product that does not form part of the universal payment protection account. That is, an accountholder may possess a financial instrument, such as a credit card, that is not part of an account associated with an embodiment of the present invention. Such a financial product is referred to herein as an "outside financial product." Such an outside financial product may have a payment obligation associated with it, such as a minimum monthly payment for a credit card. A benefit according to an embodiment of the present invention may include a line of credit that is specifically configured to pay obligations associated with outside financial products. In the example of a outside financial product credit card, a benefit may be a line of credit that covers the minimum monthly payments. Such a line of credit may be restricted for payment of that credit card only.

Note that embodiments of the present invention may be used to protect payment obligations for any of a variety of outside financial products such as, by way of non-limiting example, mortgages, loans such as car loans, savings accounts such as 401k accounts, and credit cards. Such line of credit benefits may be unrestricted, or may be restricted for use against any financial obligation including financial obligations associated with any financial product, whether an outside financial product or not.

Note also that payment protection of an outside financial product survives transfer of that outside financial product to another entity. For example, if an outside mortgage is protected, protection will survive the mortgage holder selling the mortgage to another entity. This is unlike e.g., prior art mortgage protection services where the mortgage protection is provided by the same entity that holds the mortgage.

Each trigger event is generally associated with at least one benefit. Likewise, each benefit is generally associated with at least one trigger event. As an example of a trigger event and benefit pair, certain embodiment of the present invention may include payment holidays. For example, embodiments of the present invention may offer the entity a set of certain predetermined days on which the entity may declare that a trigger event has occurred. A set of such predetermined days may typically, but not necessarily, include federal holidays. Thus, for example, once the entity selects such a set of days as part of selecting trigger events (e.g., at step 130), that entity may use any of the selected days (e.g., Veteran's Day) to declare that a trigger event has occurred. The entity may further select (e.g., at step 130) and eventually receive a benefit associated with such a trigger event. Such a benefit may include any of the benefits discussed herein. Alternately, or in addition, the entity may select a reprieve from an obligation for a limited time (e.g., a payment holiday). Such a reprieve may constitute an interest-free line of credit that automatically extends to the obligation that the entity has selected to be the recipient of the payment holiday.

Typically, the issuing bank calculates a value for each trigger event and associated benefit pair. Such a value is the result of an actuarial analysis of the trigger event, benefit, and accountholder information. The value may be calculated using standard actuarial charts, such as those prepared by or associated with the Society of Actuaries or the Social Security Administration, known to those of skill in the art. Such values generally represent an expected value of the trigger event and benefit pair. Once the issuing bank arrives at a value, it may price the associated payment protection.

Payment protection pricing may be determined as an actuarially-determined expected value plus an additional charge. The additional charge may include consideration of, by way of non-limiting example, administrative costs, marketing costs, competitive analysis, etc. Payment schemes that take into account both an actuarial value and an additional charge include, by way of non-limiting example, a flat monthly fee, a lump-sum fee, a percentage of a monthly obligation (e.g., a percentage of a monthly mortgage payment), a percentage of a total outstanding debt (e.g., a percentage of an entire mortgage), a percentage of an average monthly balance, or any combination of the preceding. Once a total fee is determined using actuarial analysis and other considerations 140, it is included 150 in a bill to the accountholder.

Figure 2:
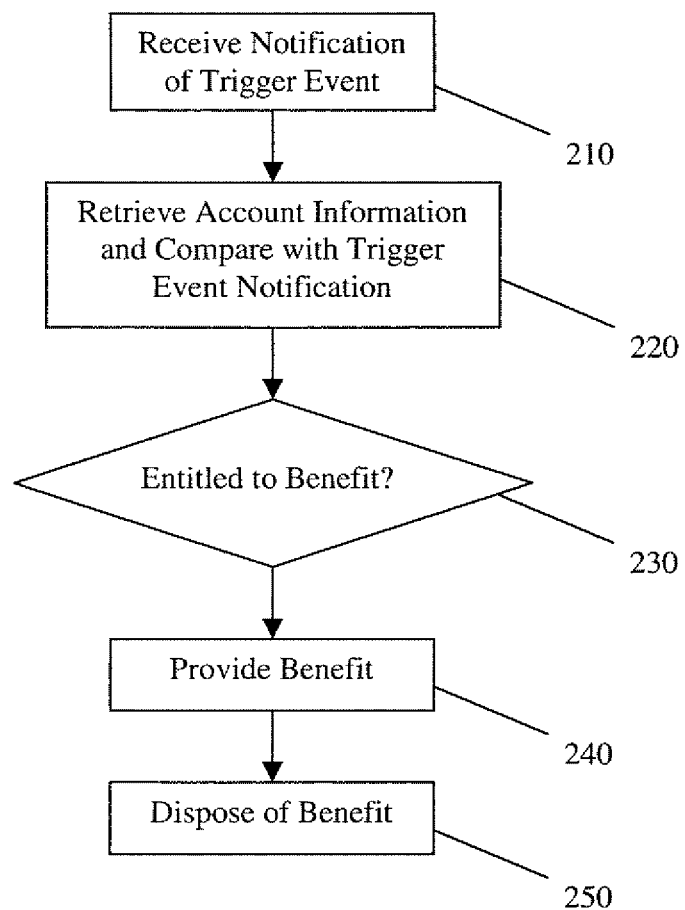
FIG. 2 is a flowchart illustrating benefit claiming according to an embodiment of the present invention.

FIG. 2 is a flowchart illustrating benefit claiming according to an embodiment of the present invention. Payment protection is typically invoked by the accountholder notifying 210 the issuing bank of a trigger event. Notification may occur by way of telephone, letter, email, or internet, such as via a webpage-based form. Trigger event notification may occur automatically, without the accountholder's participation. By way of non-limiting example, the issuing bank may receive notification of a death by monitoring coroner's reports or by other means. Once the issuing bank receives notification of a trigger event, it proceeds to retrieve 220 account information associated with the relevant accountholder. The issuing bank will generally retrieve information that reflects each trigger event and benefit pair for which the accountholder has subscribed.

The issuing bank then compares 230 the reported trigger event with those subscribed to by the accountholder and decides whether the accountholder is entitled to one or more benefits. The decision process may further involve inquiries of the accountholder or other parties. By way of non-limiting example, in the event of hospitalization, the accountholder, hospital, or insurer, for example, may be required to produce evidence of hospitalization to the issuing bank. Evidence may take the form of a receipt, insurance report, police report, or other indicia of hospitalization. Evidence may be conveyed automatically, without the participation of the accountholder. In the hospitalization example, the issuing bank may gather receipts, insurance reports, or police reports directly from, respectively, the hospital, the insurer, or the police, without the involvement of the accountholder. In general, additional evidence required by the issuing bank may include, by way of non-limiting example, receipts, official reports, death certificates, court records or orders, police records, sworn statements, verified statements, other statements, telephonic verification with the accountholder or a third party, emailed verification with the accountholder or a third party, and written verification by the accountholder or a third party. Once the issuing bank decides that the accountholder is entitled to one or more benefits, it will provide 240 the same to the accountholder.

The accountholder or other benefit recipient may receive the benefit automatically. Exemplary techniques for such automatic transfer include, by way of non-limiting example, check, direct deposit, or wire transfer to the accountholder or directly to the party to whom the obligation is due, or by addition to or distribution of a stored value card. Automatic transfer may include activation of a stored value card, e.g., using the techniques taught in U.S. Pat. No. 6,615,190 to Slater entitled "Sponsor-Funded Stored Value Card."

At step 250, the benefit is optionally disposed of. That is, certain embodiments of the present invention cancel or suspend without interest the debt incurred by accepting a benefit. The disposition of a debt arising from a benefit may be predetermined based on the terms and conditions of the debt protection agreement options selected and actively in place. That is, selecting a disposal option may occur as part of selecting benefits and trigger events. In certain embodiments, a line of credit specifically configured for payment of obligations associated with an outside financial product serves to effectively defer payment of those obligations until such time that repayment of the line of credit is due. However, certain embodiments may dispose of the benefit by entirely forgiving debt arising from the line of credit. In such embodiments, the disposal of the benefit may serve to effectively cancel outside financial product payment obligation altogether.

Figure 3:
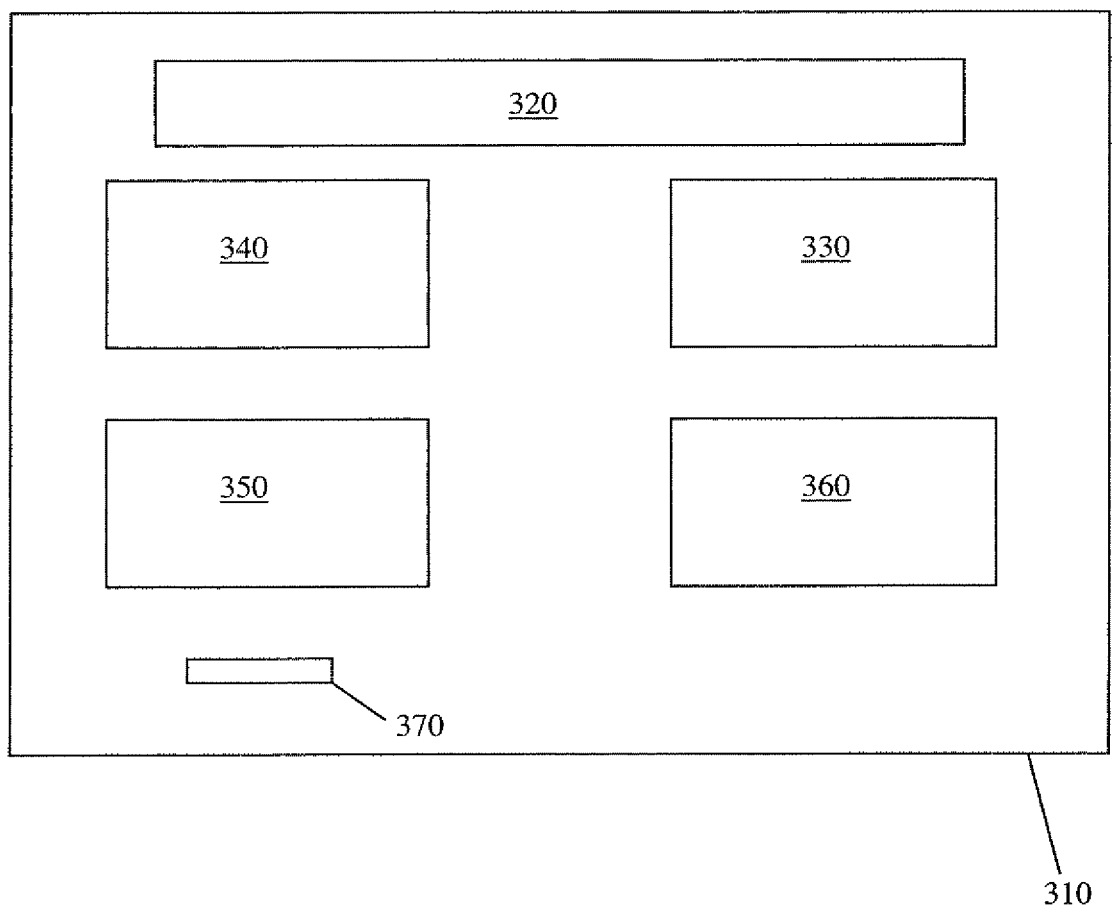
FIG. 3 is a schematic diagram illustrating a web page according to an embodiment of the present invention.

FIG. 3 is a schematic diagram illustrating a web page 310 according to an embodiment of the present invention. Such a web page may include a heading 320, which identifies the issuing bank or the payment protection program. The web page may require an accountholder to log in at portion 360 with a username and password. The web page may be used to select a trigger event from a list of trigger events 330 and a benefit from a list of benefits 340. The benefits list may dynamically change in response to selecting a trigger event. For example, if an accountholder selects "hospitalization" as a trigger event, the corresponding list of benefits 340 may alter to reflect only those benefits that are relevant upon hospitalization.

The accountholder may use the web page to select the length of time that deferment will last should the accountholder select a deferment benefit. The length of time may be an absolute length of time, e.g., measured in days, a relative length of time, e.g., until the accountholder resumes employment, or a combination of both, e.g., the longer of when the accountholder resumes employment or 100 days. The user may select a length of time from a list or may be able to enter a length of time into a field particularly designed for such a feature. Note that selection of a length of time is not limited to selection via a website; an accountholder may perform such selection telephonically, by way of regular mail, or through any other communication technique.

Embodiments of the present invention may calculate payment options in response to the accountholder's request. That is, when an accountholder selects a trigger event and benefit pair, the issuing bank typically performs an actuarial computation and calculates an associated fee (140 of FIG. 1). The issuing bank may display the fee to the accountholder in real-time on the webpage of FIG. 3 and give the accountholder an opportunity to withdraw or confirm his or her selection. The accountholder may be given an opportunity to modify the selection. For example, if the accountholder selects a deferment benefit of 100 days and decides that the calculated fee is more than the accountholder is willing to pay, the website may give the accountholder the opportunity to select a defer went period with a fewer number of days. Note that presentation of a fee is not limited to presentation via a website. The issuing bank may calculate and convey the fee amount to an accountholder telephonically, by way of regular mail, or through any other communication technique.

The account holder may specify a maximum monthly fee, and the issuing bank may calculate coverage options (trigger events and associated benefits) that are available for that amount. The issuing bank may store a list of the accountholder's payment obligations of which it is aware, and draw from such a list in response to the accountholder's request. For example, the accountholder may specify that he or she is willing to pay $5 per month for some type of payment protection. The issuing bank may determine all trigger event and benefit pairs that are available to that accountholder for such a fee. Alternately, or in addition, the accountholder may narrow the field of trigger events and/or benefits that are subject to this feature. For example, the accountholder may be interested in all deferments that are available for $5 per month on any of a variety of payment obligations. The issuing bank may then offer the accountholder a choice of payment obligations that it may defer for a fee of $5 per month. Note that presentation of trigger events and/or benefits is not limited to presentation via a website. The issuing bank may convey such options to an accountholder telephonically, by way of regular mail, or through any other communication technique.

The accountholder may specify on the website a hierarchy of debts to be paid in order upon certain trigger events. That is, where the accountholder selects debt cancellation as a benefit, he or she may further specify which debts should be cancelled in order. Specifying the order of debt cancellation may be accomplished via the web page or any other communication channel, such as telephone, mail, or email.

The accountholder may designate individuals that are to receive funds via stored value cards or other techniques upon certain trigger events. More generally, certain embodiments of the present invention allow persons other than the accountholder to receive benefits. Such persons may be specified on the web page during account signup (e.g., 130 of FIG. 1), or at any other time. Further, specifying benefit recipients may be accomplished via telephone, email, regular mail, or any other communications channel.

The web page may include a trigger event reporting feature 350. Such a feature may include a list of trigger events that the accountholder has selected and been approved for. The accountholder may use the reporting feature to report trigger events to the issuing bank. By way of non-limiting example, the reporting feature may allow the accountholder to click on a particular trigger event, which will cause a separate dialog screen to appear in which the accountholder may present details of the trigger event. As discussed above in reference to FIG. 2, the issuing bank will then take steps to process the accountholder's information and convey an associated benefit to the accountholder if appropriate.

The web page may be used to check on the status of any outstanding trigger events. By way of non-limiting example, the web page may include a list of trigger events about which the accountholder has notified the issuing bank. The accountholder may click on a listed pending trigger event, by way of non-limiting example, in order to receive information about the issuing bank's processing status of the trigger event. Such information may include an identification of additional information required by the issuing bank. It may further include an estimated time remaining until the accountholder receives the associated benefit.

Certain embodiments of the present invention may incorporate trigger events that are activated by an individual other than the accountholder. By way of non-limiting example, one such trigger event my be an accountholder's spouse involuntarily losing his or her job. As another example, hospitalization of an accountholder's child may trigger cancellation of debt associated with the accountholder. As yet another example, the accountholder may be a minor, who may receive a line of credit restricted for use against a college savings plan in response to the divorce of a parent accountholder. In this latter example, the debt arising from the line of credit may be cancelled in disposing of the benefit. In general, a benefit may protect payment obligations of the accountholder, the person associated with the trigger event, or a third party.

Note that embodiments of the present invention do not provide insurance in the traditional sense, in that they do not pay claims. Instead, certain embodiments of the present invention extend lines of credit. Repayment on these lines of credit may be canceled or deferred.

Advantages of certain embodiments of the present invention include the following. One advantage is a removal of the need for a separate consolidation contract (and signature, in the event of activation) for each separate debt or obligation. Another advantage is that the issuing bank becomes associated with many of the accountholder's obligations. Yet another advantage is that the debt protection liability does not transfer to an owner or investor in the accountholder's obligation because it does not attach to the accountholder's obligation instrument as an amendment. Therefore no prior approval or additional agreements must be made with an owner of or investor in the accountholder's obligation.

The terminology used herein is for the purpose of describing particular embodiments only, and is not intended to limit the scope of the present invention. Unless defined otherwise, all technical, financial and scientific terms used herein have the same meanings as commonly understood by one of ordinary skill in the art to which this invention belongs. As used throughout this disclosure, the singular fauns "a," "an," and "the" include plural reference unless the context clearly dictates otherwise.

I claim:

1. A computer-implemented method for providing an unrestricted line of credit to an entity from a credit provider, the method comprising:
   receiving, through a computer, an application from an entity for an unrestricted line of credit which is not limited to payment obligations associated with the credit provider;
   performing, through the computer, a risk-assessment of the application to determine credit risk of the entity, and upon a determination that the credit risk is acceptable, accepting the application;
   receiving, through the computer, a selection of trigger event and benefit pairs, each comprising a trigger event and a line of credit associated with each trigger event;
   calculating, through the computer, a value for each trigger event and benefit pair;
   calculating, through the computer, a payment protection price for each trigger event and benefit pair;
   issuing the payment protection price for each selected trigger event and benefit pair for payment by the entity;
   receiving notification that a trigger event has occurred;
   verifying the occurrence of the trigger event; and upon verification of the trigger event;
   providing, through the computer, the line of credit to the entity associated with the trigger event.

2. The method of claim 1, wherein the calculation of the value of the trigger event and benefit pair comprises at least one probabilistic computation.

3. The method of claim 2, wherein the probabilistic computation comprises at least one financial assessment associated with the trigger event.

4. The method of claim 1, further comprising determining that the entity is entitled to the unrestricted line of credit.

5. The method of claim 1, wherein the unrestricted line of credit is in the form of a check, direct deposit, wire transfer to an account, added funds to a stored value card or distribution of a stored value card.

6. The method of claim 1, wherein trigger event is involuntary loss of employment, disability, hospitalization, child birth, child adoption, retirement, divorce, medical treatment, family leave, judicial proceedings, tax events, natural disasters, call to duty, fire, flood, marriage, bankruptcy or death.

7. The method of claim 1, wherein the payment protection price is in the form of a monthly fee, a lump-sum fee, a percentage of a monthly obligation, a percentage of a total outstanding debt, a percentage of an average monthly balance or any combination thereof.

8. A computer-implemented method for providing a payment protection account to an entity from a credit provider, the method comprising:
   receiving, through a computer, an application from an entity for a payment protection account;
   performing, through the computer, a risk-assessment of the application to determine credit risk of the entity, and upon a determination that the credit risk is acceptable, accepting the application;
   providing the payment protection account to the entity;
   receiving, through the computer, a selection of trigger event and benefit pairs associated with the payment protection account, each trigger event and benefit pair comprising a trigger event and an unrestricted line of credit associated with each trigger event, wherein the unrestricted line of credit is accessible to the entity upon occurrence of the associated trigger event;
   calculating, through the computer, a value for each trigger event and benefit pair;
   calculating, through the computer, a payment protection price for each trigger event and benefit pair;
   issuing the payment protection price for each selected trigger event and benefit pair for payment by the entity.

9. The method of claim 8, further comprising receiving an indication that the trigger event has occurred.

10. The method of claim 9, further comprising providing the unrestricted line of credit to the entity in response to the indication that the trigger event has occurred.

11. The method of claim 8, further comprising verifying that the trigger event has occurred.

12. The method of claim 8, wherein the unrestricted line of credit is in the form of a check, direct deposit, wire transfer to an account, added funds to a stored value card or distribution of a stored value card.

13. The method of claim 8, wherein trigger event is involuntary loss of employment, disability, hospitalization, child birth, child adoption, retirement, divorce, medical treatment, family leave, judicial proceedings, tax events, natural disasters, call to duty, fire, flood, marriage, bankruptcy or death.

14. The method of claim 8, wherein the payment protection price is in the form of a monthly fee, a lump-sum fee, a percentage of a monthly obligation, a percentage of a total outstanding debt, a percentage of an average monthly balance or any combination thereof.

* * * * *